US009282207B2

(12) United States Patent
Yamada

(10) Patent No.: US 9,282,207 B2
(45) Date of Patent: Mar. 8, 2016

(54) DISPLAY SYSTEM INCLUDING RELAY APPARATUS AND FIRST AND SECOND DISPLAY APPARATUSES

(71) Applicant: Kei Yamada, Kawanishi (JP)

(72) Inventor: Kei Yamada, Kawanishi (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 297 days.

(21) Appl. No.: 13/788,512

(22) Filed: Mar. 7, 2013

(65) Prior Publication Data
US 2013/0235424 A1 Sep. 12, 2013

(30) Foreign Application Priority Data

Mar. 12, 2012 (JP) ................................. 2012-054005

(51) Int. Cl.
*G06F 3/12* (2006.01)
*H04N 1/00* (2006.01)
*G06K 15/00* (2006.01)
*B29C 39/00* (2006.01)
*G06F 3/041* (2006.01)

(52) U.S. Cl.
CPC .......... *H04N 1/0049* (2013.01); *H04N 1/00129* (2013.01); *H04N 1/00244* (2013.01); *H04N 1/00408* (2013.01); *H04N 1/00204* (2013.01); *H04N 2201/001* (2013.01); *H04N 2201/0094* (2013.01)

(58) Field of Classification Search
CPC ..... G05F 13/00; G06F 3/1454; G06F 3/1462; G06F 3/10; G06F 3/14; H04N 1/00002; H04N 1/00
See application file for complete search history.

(56) References Cited

U.S. PATENT DOCUMENTS 5,699,494 A * 12/1997 Colbert ................. G06F 3/1293
358/1.13
5,996,002 A * 11/1999 Katsurabayashi .... G06F 3/1454
709/204

(Continued)

FOREIGN PATENT DOCUMENTS

| JP | 8-287016 A | 11/1996 |
|---|---|---|
| JP | 2003-091479 A | 3/2003 |
| JP | 2003-175011 A | 6/2003 |
| JP | 2005-193403 A | 7/2005 |

(Continued)

OTHER PUBLICATIONS

Japanese Office Action (Notice of Allowance) dated Jan. 21, 2014, issued by the Japanese Patent Office in corresponding Japanese Patent Application No. 2012-054005, and English language translation of Office Action. (5 pages).

*Primary Examiner* — Barbara Reinier
*Assistant Examiner* — Henok A Shiferaw
(74) *Attorney, Agent, or Firm* — Buchanan Ingersoll & Rooney PC

(57) ABSTRACT

When a first remote panel accepts an operation to move a display screen, the first remote panel transmits information on the operation to a relay server. The relay server determines a destination display screen based on the received information, and transmits information on the destination display screen to each of an MFP (Multifunction Peripheral), the first remote panel, and a second remote panel. The relay server transmits data on the destination display screen to each of the first and second remote panels. After transmitting the information on the destination display screen, the relay server receives data on a neighboring screen of the destination display screen from the MFP.

21 Claims, 17 Drawing Sheets

(56) References Cited

U.S. PATENT DOCUMENTS

2003/0031992 A1 2/2003 Laferriere et al.
2006/0109343 A1* 5/2006 Watanabe ............ G02B 21/365
 348/79
2006/0290680 A1* 12/2006 Tanaka ................ H04N 1/00204
 345/173
2013/0038676 A1 2/2013 Tanaka et al.

FOREIGN PATENT DOCUMENTS

| | | | |
|---|---|---|---|
| JP | 2005-208710 | A | 8/2005 |
| JP | 2006-049964 | A | 2/2006 |
| JP | 2008-210317 | A | 9/2008 |
| JP | 2009-294625 | A | 12/2009 |
| JP | 2011-238006 | A | 11/2011 |
| JP | 2011-254453 | A | 12/2011 |

* cited by examiner

DISPLAY SYSTEM INCLUDING RELAY APPARATUS AND FIRST AND SECOND DISPLAY APPARATUSES

This application is based on Japanese Patent Application No. 2012-54005 filed with the Japan Patent Office on Mar. 12, 2012, the entire content of which is hereby incorporated by reference.

BACKGROUND OF THE INVENTION

1. Field of the Invention

The present invention relates to a display system and more particularly to a display system including an image forming apparatus including a display unit; a relay apparatus connected to the image forming apparatus by a relatively low-speed network; and a first and a second display apparatuses connected to the relay apparatus by a relatively high-speed network.

2. Description of the Background Art

In recent years, there has been a demand for cooperation between an image forming apparatus having an operating panel mounted thereon and a remote panel such as a PC (Personal Computer) or a portable information terminal. Conventionally, for example, in a remote management apparatus for an image forming apparatus, an education system, a medical diagnostic imaging system, or the like, a system in which information is shared between a plurality of apparatuses connected to a network is proposed.

The following Document 1 discloses a remote education system configured by a management server connected to a communication network such as the Internet; and student terminals that download a viewer which is a viewing tool. In the remote education system, the content of a learning material saved in the management server is downloaded onto a student terminal to display the content on the screen of the student terminal through the viewer.

The following Document 2 discloses a method for remotely servicing a medical diagnostic imaging system. This method provides a shared computing environment for a remote computing system coupled to a medical diagnostic imaging system; and collaboratively interacts with the remote computing system via the shared computing environment to service the medical diagnostic imaging system.

The following Document 3 discloses a collaborative work support system capable of setting a collaborative work environment suitable for the role of operators of collaborative work. In the collaborative work support system, when a user operates an operating area of a shared application through a user interface, an operation event is sent to a shared management unit through a communication unit. The shared management unit passes the operation event to a shared level management unit. By referring to a shared level management table in a shared level storage unit, the shared level management unit determines, from the received operation event and a user's shared level, whether the operation for the operation event is allowed for the shared level. If, as a result of the determination, the operation is allowed, then the shared level management unit instructs the shared management unit to perform a process for the received operation event, and the shared management unit allows the shared application to process the operation event.

The following Document 4 discloses a synchronization control method in which, when a plurality of communication terminals participate in the same bidirectional communication service, synchronization control for minutely categorized individual communication functions, within a communication function and between communication functions is easily performed. In the synchronization control method, for individual communication functions which are means for transmitting information on an operation performed by a user of a communication terminal, whether to perform synchronization control which is control to perform an operation performed by a user of one communication terminal in synchronization with another communication terminal, within a communication function and between communication functions is individually set for each communication function.

Document 1: Japanese Patent Publication Laying-Open No. 2009-294625
Document 2: Japanese Patent Publication Laying-Open No. 2003-175011
Document 3: Japanese Patent Publication Laying-Open No. 8-287016
Document 4: Japanese Patent Publication Laying-Open No. 2005-208710 (U.S. Pat. No. 4,292,998)

In recent years, in a display system including an image forming apparatus, a remote panel function is proposed. The remote panel function is a function that allows a screen of an operating panel (operation screen) of the image forming apparatus such as an MFP (Multifunction Peripheral) to be displayed on a remote panel connected to the image forming apparatus by a network line such as the Internet, and allows the image forming apparatus to be operable on the remote panel through the Internet. According to the remote panel function, the image forming apparatus is operable from both of the operating panel of the image forming apparatus and the remote panel. When the remote panel function is used, the manufacturer or maintenance agency of the image forming apparatus can give a user guidance on operations or solve a problem occurring in the image forming apparatus, by operating the image forming apparatus on their remote panel while viewing a display screen of the operating panel of the image forming apparatus (user operation) on the remote panel. The conventional remote panel function is implemented by transmitting operation information accepted by the remote panel to the image forming apparatus via a network line and transmitting data of a display screen of the operating panel associated with the operation information from the image forming apparatus to the remote panel via the network line.

In recent image forming apparatuses, high performance of an operating panel has been advanced, and there are an apparatus capable of accepting multi-touch operation, an apparatus that displays animation when a button operation is accepted, and the like. When a high-performance operating panel is operated using the conventional remote panel function, the speed of an Internet line is often not sufficient for the amount of data (traffic) transmitted and received between an image forming apparatus and a remote panel, leading to a remarkable degradation of operation response.

Meanwhile, the technologies and functions of conventional image forming apparatuses such as MFPs are diversified. Thus, it is difficult for a person in charge at the manufacturer or maintenance agency of an image forming apparatus to thoroughly know all functions of the image forming apparatus by him/herself. When giving a user guidance on the operation of the image forming apparatus or solving a problem occurring in the image forming apparatus, there are more cases of handling such a situation by a plurality of persons in charge with different specialties. In these cases, while the plurality of persons in charge simultaneously view the operating panel of the image forming apparatus on their remote panels, the image forming apparatus is operated on their remote panels. As a result, there arises a need to transmit data from the image forming apparatus to each of the plurality of remote panels and transmit information on an operation input, a priority process, etc., from each remote panel to the image forming apparatus. This further increases the amount of data transmitted and received between the image forming apparatus and the remote panels, causing a further degradation of operation response.

FIG. 17 is a diagram schematically showing transmission and reception of data between an image forming apparatus and each remote panel in a conventional display system. Note that in FIG. 17 data transmitted and received between the image forming apparatus and each remote panel is indicated by dashed-line arrows.

With reference to FIG. 17, this display system is configured by a customer's network and a vendor's network connected to each other by the Internet. The customer's network includes an MFP (MFP panel) 1100 serving as an image forming apparatus. The vendor's network includes a relay server 1200 and remote panels (remote panel applications) 1300a, 1300b, and 1300c. Remote panels 1300a and 1300b are placed in a call center in the vendor, and remote panel 1300c is placed in a development department in the vendor. Relay server 1200 and remote panels (remote panel applications) 1300a, 1300b, and 1300c are connected to each other by an intranet.

The case is assumed in which MFP 1100 is operated while a plurality of persons in charge simultaneously view an operating panel of MFP 1100 on their remote panels 1300a, 1300b, and 1300c. In this case, every time the display screen of the operating panel is changed, data on the screen of the operating panel is transmitted from MFP 1100 to each of remote panels 1300a, 1300b, and 1300c via relay server 1200. On the other hand, when any of remote panels 1300a, 1300b, and 1300c performs an operation on the image forming apparatus, information on an operation input, etc., is transmitted from the remote panel to MFP 1100. As such, in the conventional technique, since a large amount of data is exchanged between MFP 1100 and each of remote panels 1300a, 1300b, and 1300c, a triple load is placed on MFP 1100 compared to the case in which MFP 1100 and one remote panel perform communication. Thus, the amount of communication in all network paths in the display system is tripled. In particular, the customer's network and the vendor's network are connected to each other by the Internet having a lower speed than the intranet. Hence, when a large amount of data is exchanged between the MFP 1100 included in the customer's network and the relay server 1200 included in the vendor's network, the response of communication therebetween degrades. As a result, operation response degrades in all network paths.

SUMMARY OF THE INVENTION

An object of the present invention is to provide a display system capable of inhibiting degradation of operation response.

A display system according to one aspect of the present invention includes an image forming apparatus including a display unit; a relay apparatus connected to the image forming apparatus by a relatively low-speed network; and a first and a second display apparatuses connected to the relay apparatus by a network having a higher speed than the network, the display system including: a first operation acceptor for accepting, by the first display apparatus, an operation to move a display screen; a first operation information transmitter for transmitting information on the operation accepted by the first operation acceptor, from the first display apparatus to the relay apparatus; a destination screen determining unit for determining, by the relay apparatus, a destination display screen based on the information transmitted by the first operation information transmitter; a destination screen information transmitter for transmitting information on the destination display screen from the relay apparatus to each of the image forming apparatus and the first and second display apparatuses; a first destination screen data transmitter for transmitting data on the destination display screen from the relay apparatus to each of the first and second display apparatuses; a screen display unit for displaying a screen based on the information transmitted by the destination screen information transmitter, on each of the display unit and the first and second display apparatuses; and a neighboring screen data transmitter for transmitting data on a neighboring screen of the destination display screen from the image forming apparatus to the relay apparatus after transmitting the information on the destination display screen by the destination screen information transmitter.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

One embodiment of the present invention will be described below based on the drawings.

A display system of the present embodiment includes an image forming apparatus including a display unit; a relay apparatus connected to the image forming apparatus by a relatively low-speed network; and a first and a second display apparatuses connected to the relay apparatus by a relatively high-speed network. The display apparatuses are apparatuses capable of displaying various information. In the present embodiment, the case will be described in which the image forming apparatus is an MFP and the display apparatuses are remote panels.

[Configuration of the Display System]

First, a configuration of the display system of the present embodiment will be described.

Figure 1:
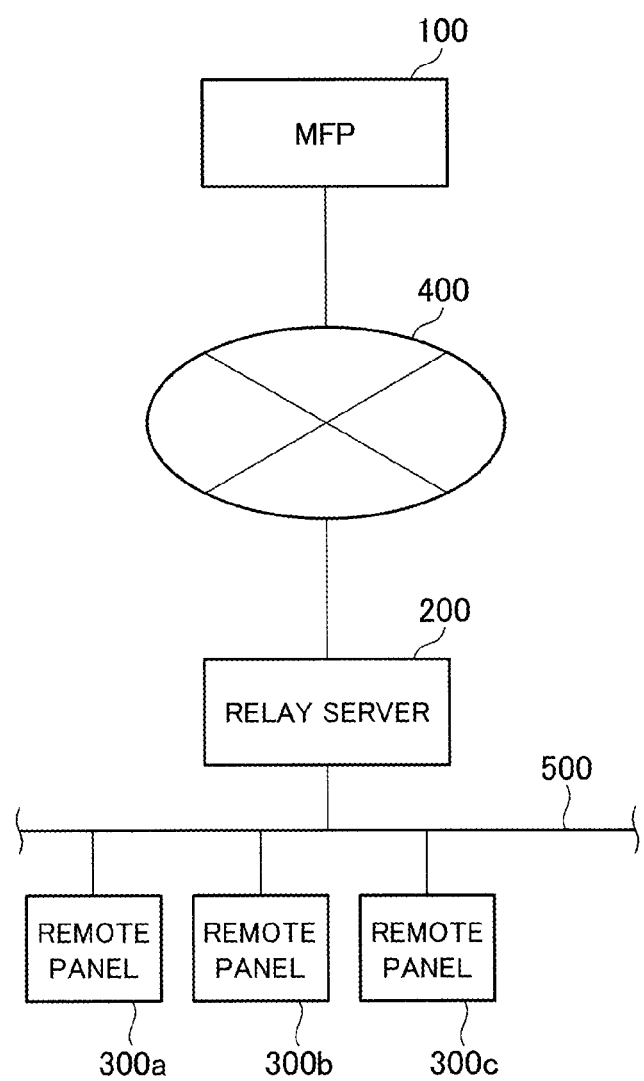
FIG. 1 is a diagram showing a schematic configuration of a display system of one embodiment of the present invention.

With reference to FIG. 1, the display system includes an MFP 100, a relay server 200 serving as a relay apparatus, and remote panels 300a, 300b, and 300c. MFP 100 and relay server 200 are connected to each other via, for example, Internet 400. Relay server 200 and each of remote panels 300a, 300b, and 300c are connected to each other via, for example, an intranet 500. Each of remote panels 300a, 300b, and 300c is connected to MFP 100 through relay server 200.

Intranet 500 is a network in a limited area, such as in a company or in a school, that uses a dedicated line, e.g., a wired or wireless LAN (Local Area Network). Intranet 500 is a network having a higher communication speed than Internet 400. On the other hand, Internet 400 is a network having a lower communication speed than intranet 500.

Internet 400 and intranet 500 connect various devices using the TCP/IP (Transmission Control Protocol/Internet Protocol) protocol. The devices connected to Internet 400 or intranet 500 can exchange various data with each other.

Note that as long as a network that connects relay server 200 to each of remote panels 300a, 300b, and 300c has a higher communication speed than a network that connects MFP 100 to relay server 200, the network that connects relay server 200 to each of remote panels 300a, 300b, and 300c does not need to be an intranet and may be the Internet.

MFP 100 forms on paper, for example, a scanned document image or a copied image for an image created based on print data received from remote panel 300a, 300b, or 300c, etc. The print data is data obtained by, for example, converting, by a printer driver, a rendering instruction issued by the operating system or application program of remote panel 300a, 300b, or 300c to a page description language processable by MFP 100. The print data may be document data, etc., described in a file format such as PDF, TIFF, JPEG, or XPS.

MFP 100 can also transmit a document image to remote panel 300a, 300b, or 300c through Internet 400 and intranet 500. MFP 100 can further accumulate document data received from remote panel 300a, 300b, or 300c, in a storage unit 104 (FIG. 2) in MFP 100.

Each of remote panels 300a, 300b, and 300c can perform transmission and reception of data with MFP 100 by wireless communication or wired communication (preferably, wireless communication).

Note that the display system may have a different configuration from that of FIG. 1. The image forming apparatus may be other than an MFP and may be a facsimile apparatus, a copier, a printer, etc.

Figure 2:
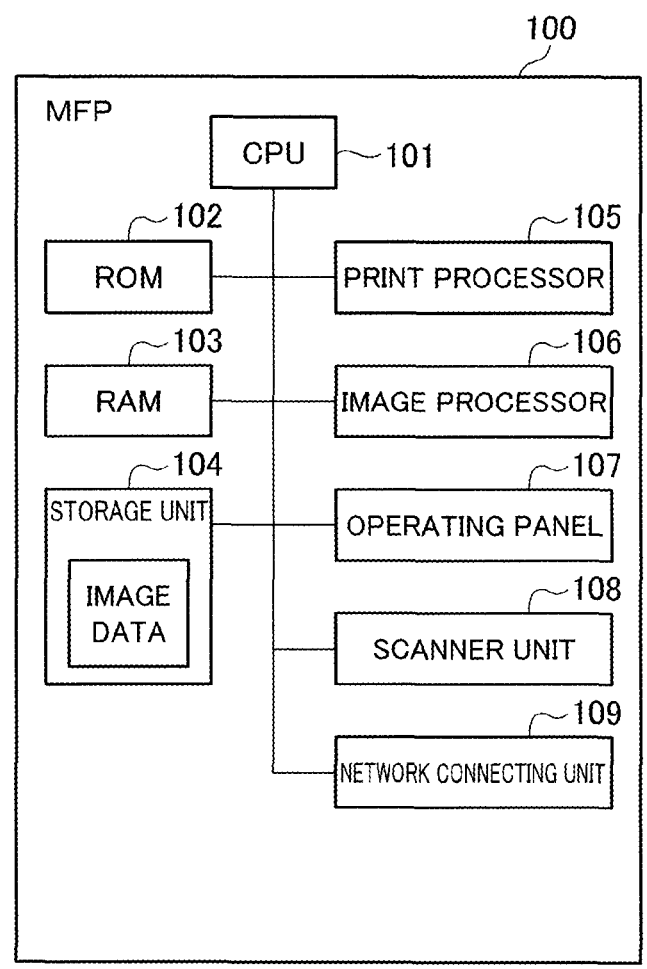
FIG. 2 is a block diagram showing an internal configuration of an MFP 100.

FIG. 2 is a block diagram showing an internal configuration of MFP 100.

With reference to FIG. 2, MFP 100 includes a CPU (Central Processing Unit) 101, a ROM (Read Only Memory) 102, a RAM (Random Access Memory) 103, storage unit 104, a print processor 105, an image processor 106, an operating panel 107 (MFP panel), a scanner unit 108, a network connecting unit 109, etc. Each of ROM 102, RAM 103, storage unit 104, print processor 105, image processor 106, operating panel 107, scanner unit 108, and network connecting unit 109 is connected to CPU 101 via a bus.

CPU 101 performs overall control of MFP 100 for various jobs such as a scan job, a copy job, an email sending job, and a print job. In addition, CPU 101 executes a control program stored in ROM 102. CPU 101 reads data from ROM 102 or RAM 103 or writes data into ROM 102 or RAM 103 by performing a predetermined process.

ROM 102 is, for example, a flash ROM (Flash Memory). ROM 102 stores therein various programs for performing the operation of MFP 100 and various fixed data. ROM 102 may be non-rewritable.

RAM 103 is a main memory of CPU 101. RAM 103 is used, for example, to temporarily store data required when CPU 101 executes the control program, and image data.

Storage unit 104 is composed of, for example, an HDD (Hard Disk Drive) and stores device installation information, various data about the operation of MFP 100, or the like. In addition, storage unit 104 stores in a box, for example, data such as print data transmitted through network connecting unit 109 from remote panel 300a, 300b, or 300c, etc. In addition, storage unit 104 stores information and data on screens to be displayed on each of operating panel 107 and remote panels 300a, 300b, and 300c. Note that information on a screen includes the ID (identification), last updated date and time, etc., of the screen.

Print processor 105 performs a printing process onto paper, etc., based on image data processed by image processor 106.

Image processor 106 performs, for example, a RIP (Raster Image Processing) process on print data and a conversion process in which, when data is transmitted to an external source, the format of the data is converted to another. When image data of a screen to be displayed on each of operating panel 107 and remote panels 300a, 300b, and 300c is transmitted to relay server 200, image processor 106 processes an image to be transmitted into a low- or high-resolution image, in response to a request from relay server 200.

Operating panel 107 includes a key input unit composed of a numeric keypad, a start key, etc., and a display unit composed of a touch panel display, etc. Operating panel 107 accepts from a user various input operations such as execution of various jobs on MFP 100. In addition, operating panel 107 displays to the user various setting items for MFP 100, messages, etc.

Scanner unit 108 reads document images.

Network connecting unit 109 performs communication with relay server 200 through Internet 400 by a communication protocol such as TCP/IP, according to an instruction from CPU 101.

Figure 3:
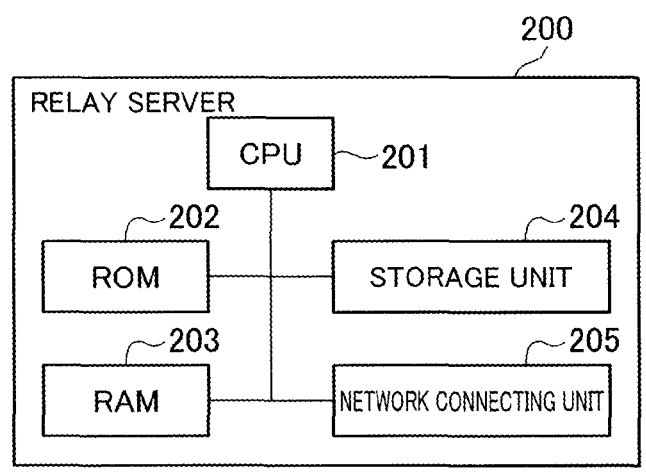
FIG. 3 is a block diagram showing an internal configuration of a relay server 200.

FIG. 3 is a block diagram showing an internal configuration of relay server 200.

With reference to FIG. 3, relay server 200 is composed of, for example, a PC and includes a CPU 201, a ROM 202, a RAM 203, a storage unit 204, a network connecting unit 205, etc. Each of ROM 202, RAM 203, storage unit 204, and network connecting unit 205 is connected to CPU 201 via a bus.

CPU 201 performs overall control of relay server 200. In addition, CPU 201 executes a control program stored in ROM 202. CPU 201 reads data from ROM 202 or RAM 203 or writes data into ROM 202 or RAM 203 by performing a predetermined process.

ROM 202 is, for example, a flash ROM. ROM 202 stores therein various programs for performing the operation of relay server 200 and various fixed data. ROM 202 may be non-rewritable.

RAM 203 is a main memory of CPU 201. RAM 203 is used, for example, to temporarily store data required when CPU 201 executes the control program, and image data. RAM 203 forms a cache memory of CPU 201.

Storage unit 204 is composed of, for example, an HDD and stores various data about the operation of relay server 200, etc. In addition, storage unit 204 is provided with a screen buffer area for animation which is an area that temporarily stores image data to be displayed on a display unit 305 of a remote panel 300.

Network connecting unit 205 performs communication with MFP 100 through Internet 400 by a communication protocol such as TCP/IP, according to an instruction from CPU 201. In addition, network connecting unit 205 performs communication with each of remote panels 300*a*, 300*b*, and 300*c* through intranet 500 by a communication protocol such as TCP/IP, according to an instruction from CPU 201.

Figure 4:
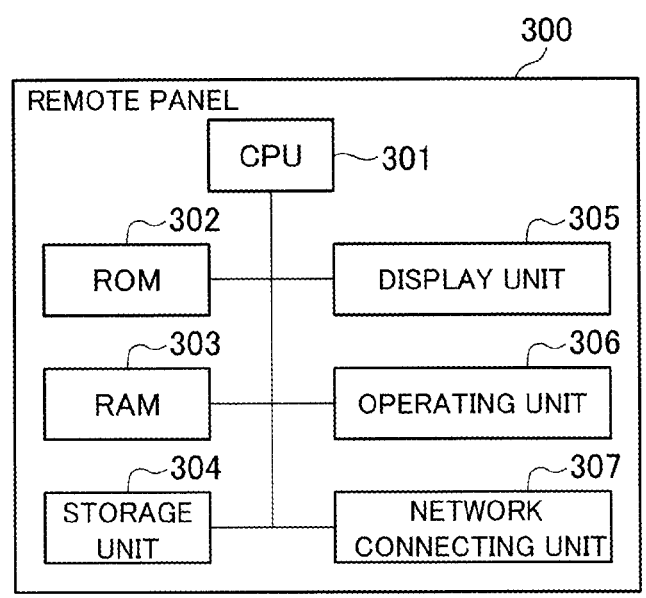
FIG. 4 is a block diagram showing an internal configuration of each of remote panels 300a, 300b, and 300c.

FIG. 4 is a block diagram showing an internal configuration of each of remote panels 300*a*, 300*b*, and 300*c*. Note that in FIG. 4 an arbitrary one of remote panels 300*a*, 300*b*, and 300*c* is shown as a remote panel 300.

With reference to FIG. 4, remote panel 300 is composed of a PC, a portable communication terminal, or the like, having a remote panel application installed thereon. Remote panel 300 includes a CPU 301, a ROM 302, a RAM 303, a storage unit 304, a display unit 305, an operating unit 306, a network connecting unit 307, etc. Each of ROM 302, RAM 303, storage unit 304, display unit 305, operating unit 306, and network connecting unit 307 is connected to CPU 301 via a bus.

CPU 301 performs overall control of remote panel 300. In addition, CPU 301 executes a control program stored in ROM 302. CPU 301 reads data from ROM 302 or RAM 303 or writes data into ROM 302 or RAM 303 by performing a predetermined process.

ROM 302 is, for example, a flash ROM. ROM 302 stores therein various programs for performing the operation of remote panel 300 and various fixed data. ROM 302 may be non-rewritable.

RAM 303 is a main memory of CPU 301. RAM 303 is used, for example, to temporarily store data required when CPU 301 executes the control program, and image data. RAM 303 may have a cache memory area of CPU 301.

Storage unit 304 is composed of, for example, an HDD and stores various data about the operation of remote panel 300, etc. Storage unit 304 may have a local buffer area.

Display unit 305 displays various setting items for remote panel 300, messages, etc. In addition, display unit 305 displays a screen based on information received from MFP 100.

Operating unit 306 accepts various instructions for remote panel 300 from a user.

Network connecting unit 307 performs communication with relay server 200 through intranet 500 by a communication protocol such as TCP/IP, according to an instruction from CPU 301.

[Operation of the Display System]

Next, an example of the operation of the display system of the present embodiment will be described.

Figure 5:
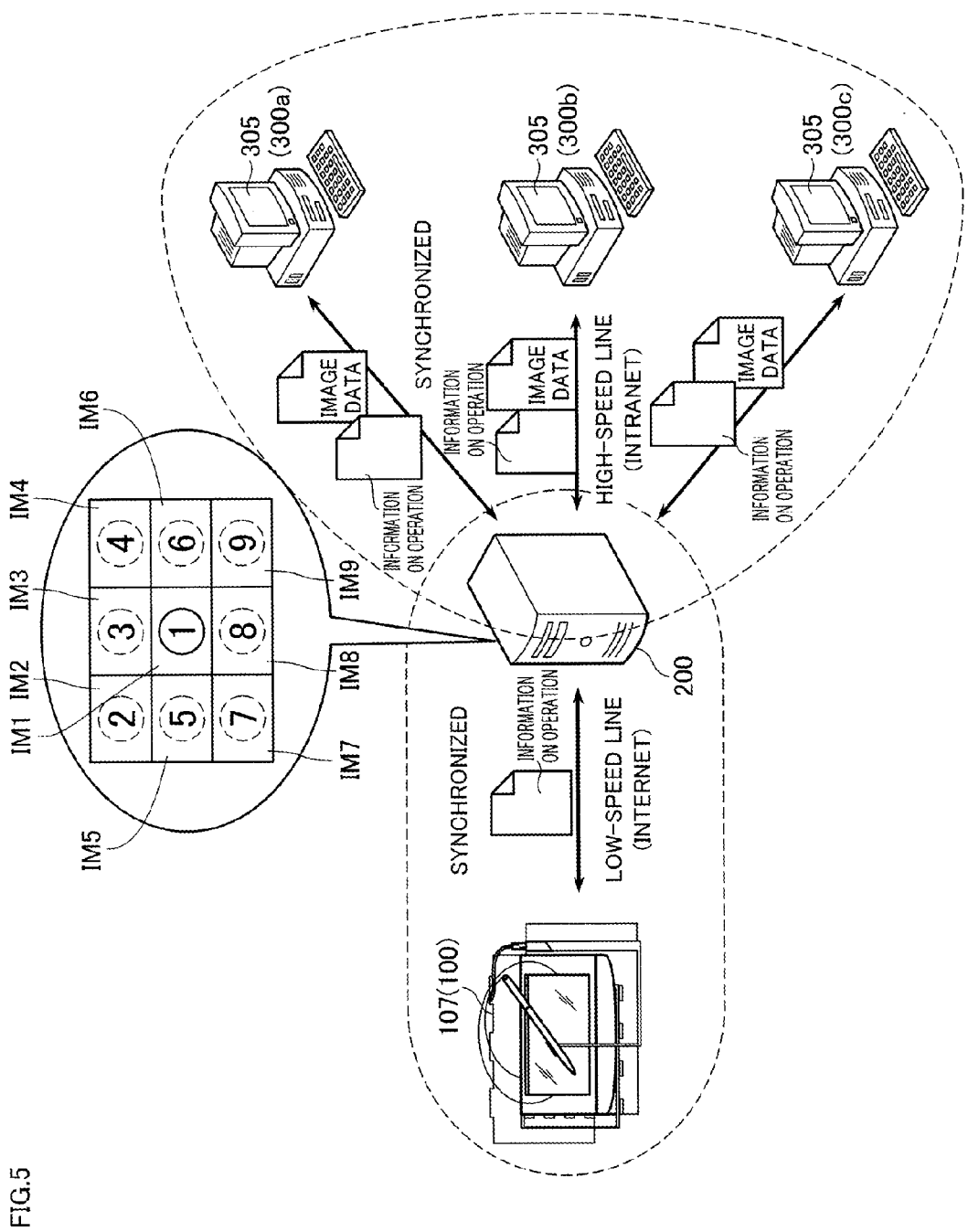
FIG. 5 is a diagram conceptually showing communication performed by the display system of the one embodiment of the present invention.

FIG. 5 is a diagram conceptually showing communication performed by the display system of the one embodiment of the present invention.

With reference to FIG. 5, in the display system of the present embodiment, relay server 200 temporarily stores in storage unit 204, etc., high-resolution data and information on a central image IM1 which is a display screen of each of MFP 100 and remote panels 300*a*, 300*b*, and 300*c*, and low-resolution data and information on neighboring images IM2 to IM9 which are neighboring screens of the display screen (neighboring images of central image IM1). Central image IM1 stored in relay server 200 is synchronized with the display screens of respective remote panels 300*a*, 300*b*, and 300*c*. In addition, central image IM1 stored in relay server 200 is synchronized with the display screen of operating panel 107 of MFP 100. Synchronization between central image IM1 stored in relay server 200 and the display screen of operating panel 107 is performed at different timing from timing at which synchronization between central image IM1 stored in relay server 200 and the display screens of respective remote panels 300*a*, 300*b*, and 300*c* is performed.

When any of MFP 100 and remote panels 300*a*, 300*b*, and 300*c* accepts an operation to move the display screen from a user, relay server 200 determines a destination display screen and transmits information on the destination display screen (the ID (Identification), last updated date and time, etc., of the destination display screen) and the low-resolution data on neighboring image IM6 which is the destination display screen, to each of remote panels 300*a*, 300*b*, and 300*c*. On the other hand, after relay server 200 has transmitted the information on the destination display screen to each of remote panels 300*a*, 300*b*, and 300*c*, MFP 100 asynchronously transmits to relay server 200 high-resolution data on neighboring image IM6 and low-resolution data on neighboring screens of the destination display screen.

This enables the plurality of remote panels 300*a*, 300*b*, and 300*c* to perform operations on the operating panel 107 without causing an increase in traffic or load on MFP 100 or Internet 400. In addition, the amount of information transferred over Internet 400 which is a low-speed line is reduced, enabling to change display on operating panel 107 at a quick response.

Note that although in the above description the case is described in which relay server 200 temporarily holds data on neighboring screens of a display screen of operating panel 107 of MFP 100, relay server 200 may temporarily hold data on a screen displayed when a software key included in a display screen of operating panel 107 of MFP 100 is pressed (a lower or upper level screen of the display screen).

Figure 6:
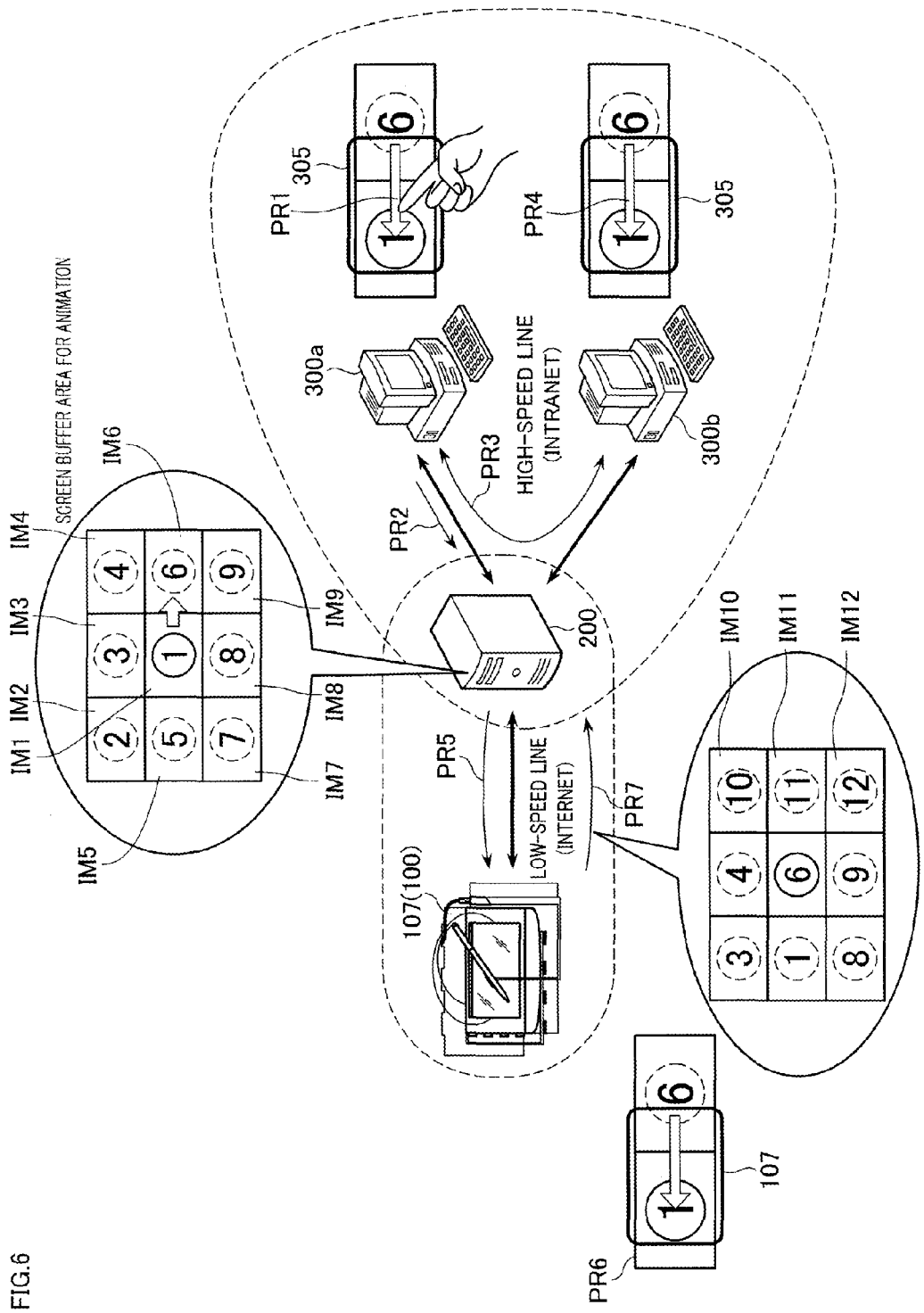
FIG. 6 is a diagram schematically showing the operation of the display system of the one embodiment of the present invention.

FIG. 6 is a diagram schematically showing the operation of the display system of the one embodiment of the present invention. Note that although in the following description, description of the operation of remote panel 300*c* is omitted for convenience sake, remote panel 300*c* basically performs the same operation as remote panel 300*b*.

With reference to FIG. 6, a central image IM1 is displayed on each of operating panel 107 of MFP 100 and display units 305 of remote panels 300*a* and 300*b*. Relay server 200 holds, in a screen buffer area for animation, high-resolution data on central image IM1 and low-resolution data on each of neighboring images IM2 to IM9. Each of remote panels 300*a* and 300*b* shares the screen buffer area for animation of relay server 200 and thus can perform synchronization of a display screen with central image IM1 held in relay server 200.

The case is assumed in which, for example, as shown by a process PR1, remote panel 300a has accepted an operation to move the display screen from central image IM1 to neighboring image IM6. When display unit 305 is a touch panel, this operation corresponds to a flick operation where an operating finger is allowed to move from the right side to the left side of display unit 305 in FIG. 6.

In this case, as shown by a process PR2, remote panel 300a transmits information on the operation to relay server 200. Based on the received information on the operation, relay server 200 determines neighboring image IM6 to be a destination display screen. Then, as shown by a process PR3, relay server 200 transmits information on neighboring image IM6 and the low-resolution data on neighboring image IM6 to each of remote panels 300a and 300b. Since transmission of the information on neighboring image IM6 and the low-resolution data on neighboring image IM6 is performed through intranet 500 which is a high-speed line, the load thereof is not so heavy. As shown by a process PR4, each of remote panels 300a and 300b displays a low-resolution screen for neighboring image IM6 on display unit 305, based on the received information.

When relay server 200 transmits the information on neighboring image IM6 to remote panels 300a and 300b, as shown by a process PR5, relay server 200 also transmits information on neighboring image IM6 to MFP 100. Although transmission of the information on neighboring image IM6 is performed through Internet 400 which is a low-speed line, since the volume of the information on neighboring image IM6 is smaller than image data, the load thereof is not so heavy. As shown by a process PR6, MFP 100 retrieves, based on the received information, data on neighboring image IM6 from image data stored in storage unit 104, and displays a screen for neighboring image IM6 on operating panel 107.

After relay server 200 has transmitted the information on neighboring image IM6 to each of MFP 100 and remote panels 300a and 300b, as shown by a process PR7, MFP 100 transmits to relay server 200 high-resolution data on neighboring image IM6 and low-resolution data on images IM10 to IM12 which is data not held in relay server 200 among neighboring screens of the destination display screen (neighboring images of neighboring image IM6). MFP 100 does not transmit images IM1, IM3, IM4, IM8, and IM9 already held in relay server 200. Transmission of the data by MFP 100 is performed asynchronously to transmission of data from relay server 200 to each of remote panels 300a and 300b. When relay server 200 receives the data, relay server 200 transmits high-resolution data on neighboring image IM6 to each of remote panels 300a and 300b. In addition, relay server 200 holds, in the screen buffer area for animation, the high-resolution data on neighboring image IM6 and the low-resolution data on neighboring images IM1, IM3, IM4, and IM8 to IM12. When remote panels 300a and 300b receive the high-resolution data on neighboring image IM6, remote panels 300a and 300b change neighboring image IM6 being displayed from the low-resolution one to the high-resolution one.

Figure 7:
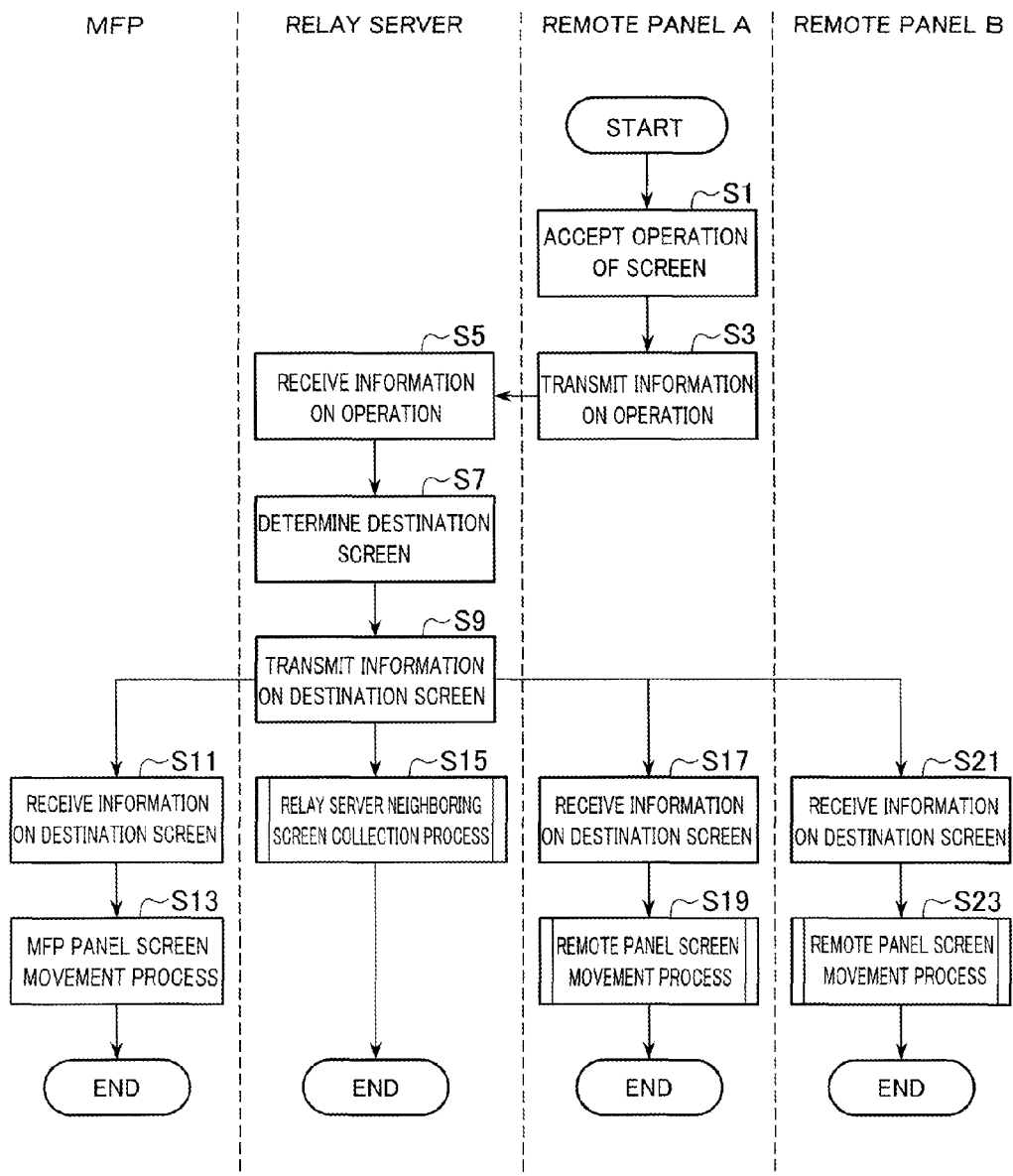
FIG. 7 is a flowchart showing the operation of the display system performed when a display screen is moved, which is initiated by an operation on a remote panel A.

FIG. 7 is a flowchart showing the operation of the display system performed when a display screen is moved, which is initiated by an operation on a remote panel A. Note that in the following description of the flowchart, remote panel 300a may be described as remote panel A, and remote panel 300b may be described as a remote panel B.

With reference to FIG. 7, when CPU 301 of remote panel A accepts an operation to move a display screen (S1), CPU 301 transmits information on the operation to relay server 200 (S3). When CPU 201 of relay server 200 receives the information on the operation from remote panel A (S5), CPU 201 determines a destination display screen, based on the information (S7). Then, CPU 201 transmits information on the determined destination display screen to each of MFP 100 and remote panels A and B (S9). Thereafter, CPU 201 performs a relay server neighboring screen collection process shown in FIG. 8 (S15) and ends the process.

When CPU 101 of MFP 100 receives the information on the destination display screen from relay server 200 (S11), CPU 101 performs an MFP panel screen movement process (S13) and ends the process. Specifically, CPU 101 retrieves, based on the received information on the destination display screen, data on the destination display screen from data on screens stored in storage unit 104, and displays a screen based on the data on operating panel 107.

Figure 9:
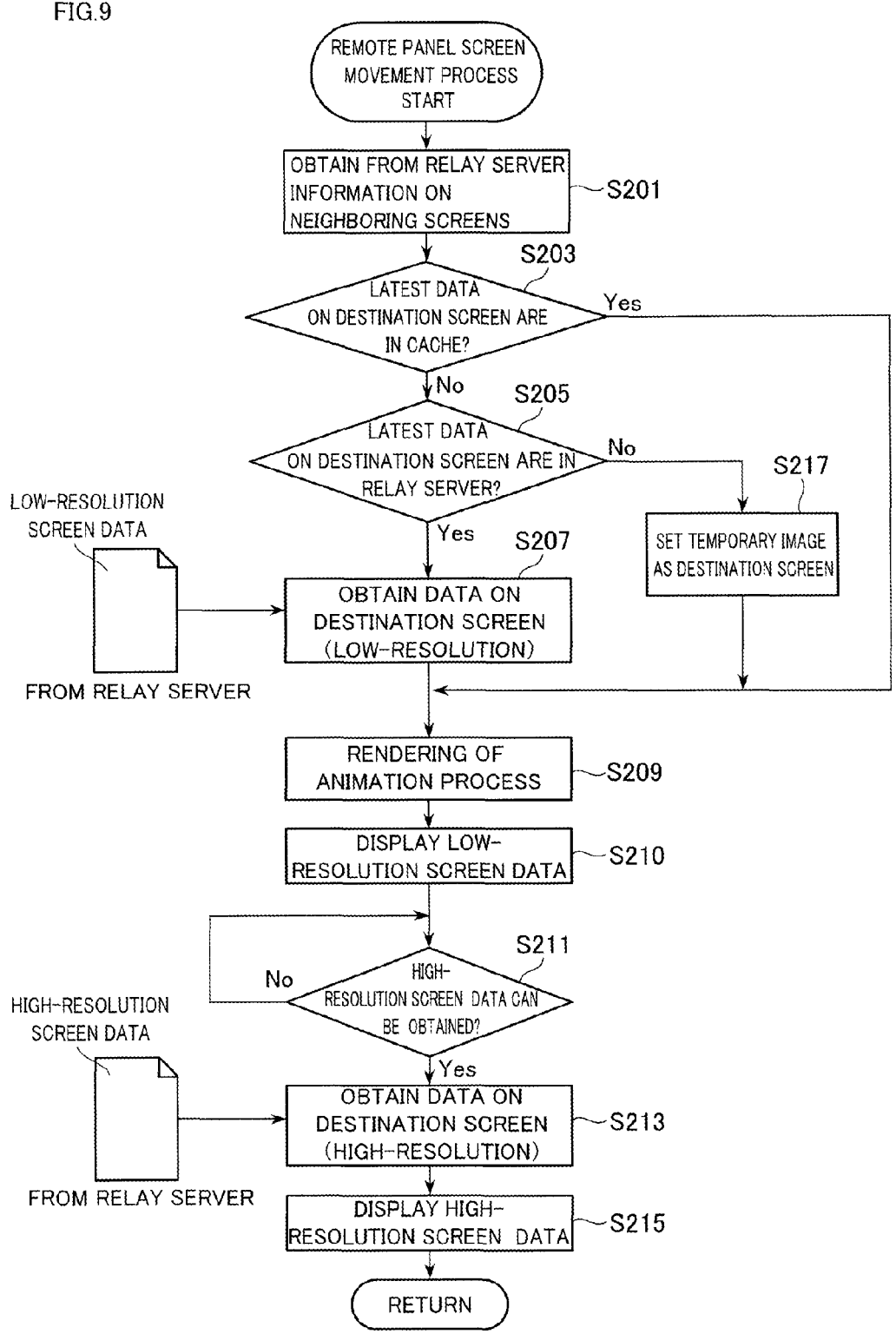
FIG. 9 is a subroutine of step S19 in FIG. 7.

When CPU 301 of remote panel A receives the information on the destination display screen from relay server 200 (S17), CPU 301 performs a remote panel screen movement process shown in FIG. 9 (S19) and ends the process. Likewise, when CPU 301 of remote panel B receives the information on the destination display screen from relay server 200 (S21), CPU 301 performs a remote panel screen movement process shown in FIG. 9 (S23) and ends the process.

Figure 8:
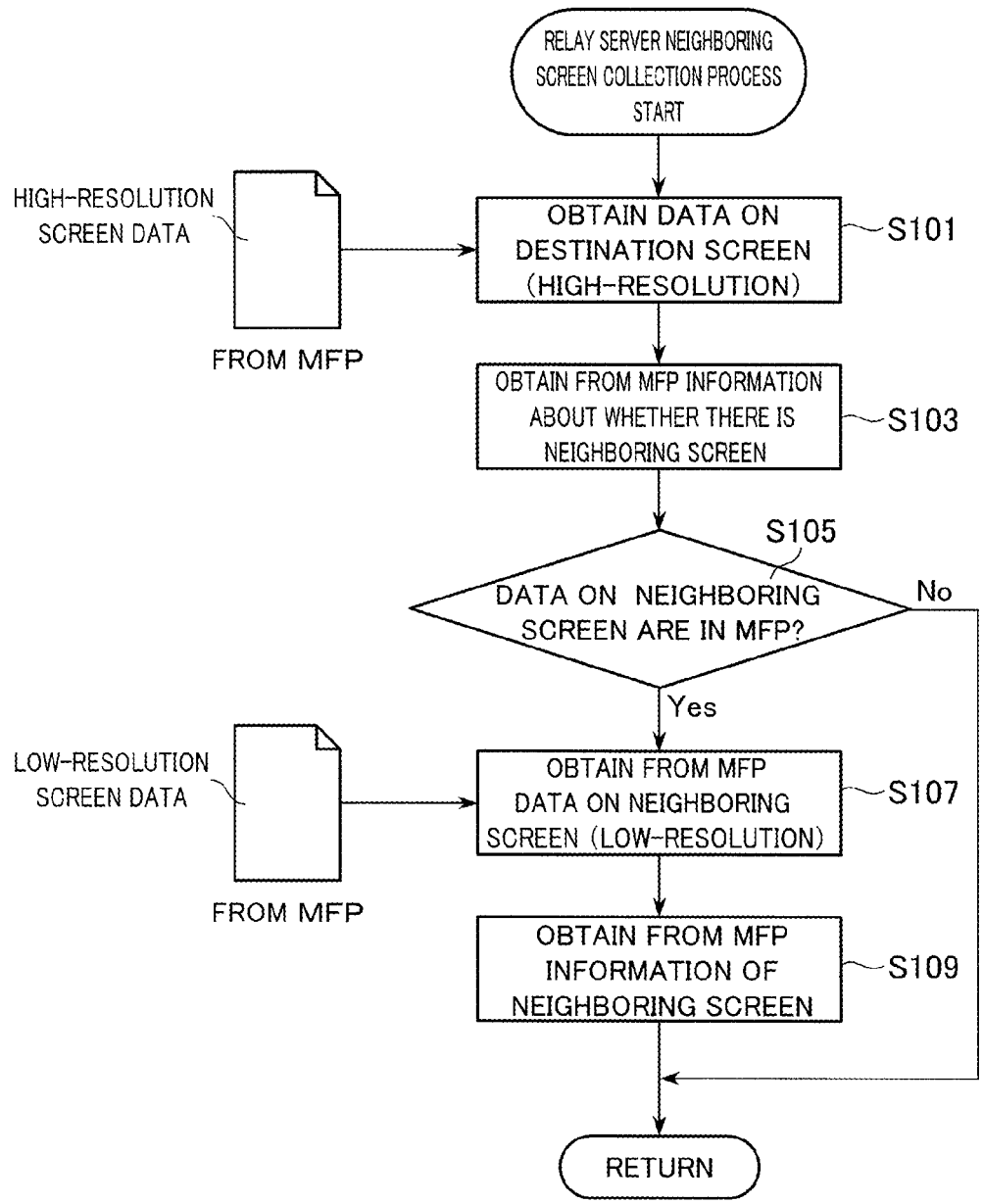
FIG. 8 is a subroutine of step S15 in FIG. 7.

FIG. 8 shows a subroutine of step S15 in FIG. 7.

With reference to FIG. 8, in the relay server neighboring screen collection process in step S15, CPU 201 of relay server 200 obtains high-resolution data on the destination display screen from MFP 100 (S101), and obtains information about whether there are neighboring screens of the destination display screen, from MFP 100 (S103). Subsequently, CPU 201 determines, based on the information obtained in step S103, whether MFP 100 holds data on the neighboring screens of the destination display screen (S105).

If it is determined in step S105 that data is held (Yes in S105), then CPU 201 obtains from MFP 100 low-resolution data on the neighboring screens of the destination display screen (S107) and obtains from MFP 100 information on the neighboring screens of the destination display screen (S109) and then returns. On the other hand, if it is determined in step S105 that data is not held (No in S105), then CPU 201 returns.

Note that CPU 201 may store, in the screen buffer area for animation, the low-resolution data on the neighboring screens of the destination display screen and the information on the neighboring screens of the destination display screen which are obtained in steps S107 and S109. In this case, in step S107, CPU 201 may obtain only data that is not stored in the screen buffer area for animation among the data on the neighboring screens of the destination display screen.

FIG. 9 shows a subroutine of step S19 in FIG. 7.

With reference to FIG. 9, in the remote panel screen movement process in step S19, CPU 301 of remote panel A or B obtains information on neighboring screens of the current display screen (display screen before movement) from relay server 200 (S201) and determines, based on the information, whether remote panel A or B holds the latest data on the destination display screen in a cache (S203). If it is determined in step S203 that the latest data is held in the cache (Yes in S203), then CPU 301 proceeds to a process in step S209.

If it is determined in step S203 that the latest data is not held in the cache (No in S203), then CPU 301 determines, based on the information obtained in step S201, whether relay server 200 holds the latest data on the destination display screen (S205).

If it is determined in step S205 that relay server 200 holds the latest data (Yes in S205), then CPU 301 obtains low-resolution data on the destination display screen from relay server 200 (S207) and proceeds to a process in step S209. On the other hand, if it is determined in step S205 that relay server 200 does not hold the latest data (No in S205), then remote panels A and B are in a state of not being able to display the destination screen. In this case, CPU 301 sets, as the destination display screen, a predetermined temporary image held in advance in storage unit 304 or the like (S217) and proceeds to a process in step S209.

In step S209, CPU 301 performs rendering of an animation process based on the obtained data (S209) and displays a rendered image as the destination display screen (S210). The screen displayed in step S210 is a low-resolution destination display screen if the rendering is performed based on the low-resolution data, or is a temporary image if the temporary image is set as the destination display screen.

Subsequently, CPU 301 determines whether high-resolution data on the destination display screen can be obtained from relay server 200 (S211). The process in step S211 is repeatedly performed until high-resolution data can be obtained.

If it is determined in step S211 that high-resolution data can be obtained (Yes in S211), then CPU 301 obtains high-resolution data on the destination display screen from relay server 200 (S213) and displays a high-resolution destination display screen based on the obtained data (S215) and then returns.

[First Variant of the Operation of the Display System]

Next, a first variant of the operation of the display system of the present embodiment will be described. In the present variant, the operation of the display system performed when remote panel A or B has a local buffer area will be described.

Figure 10:
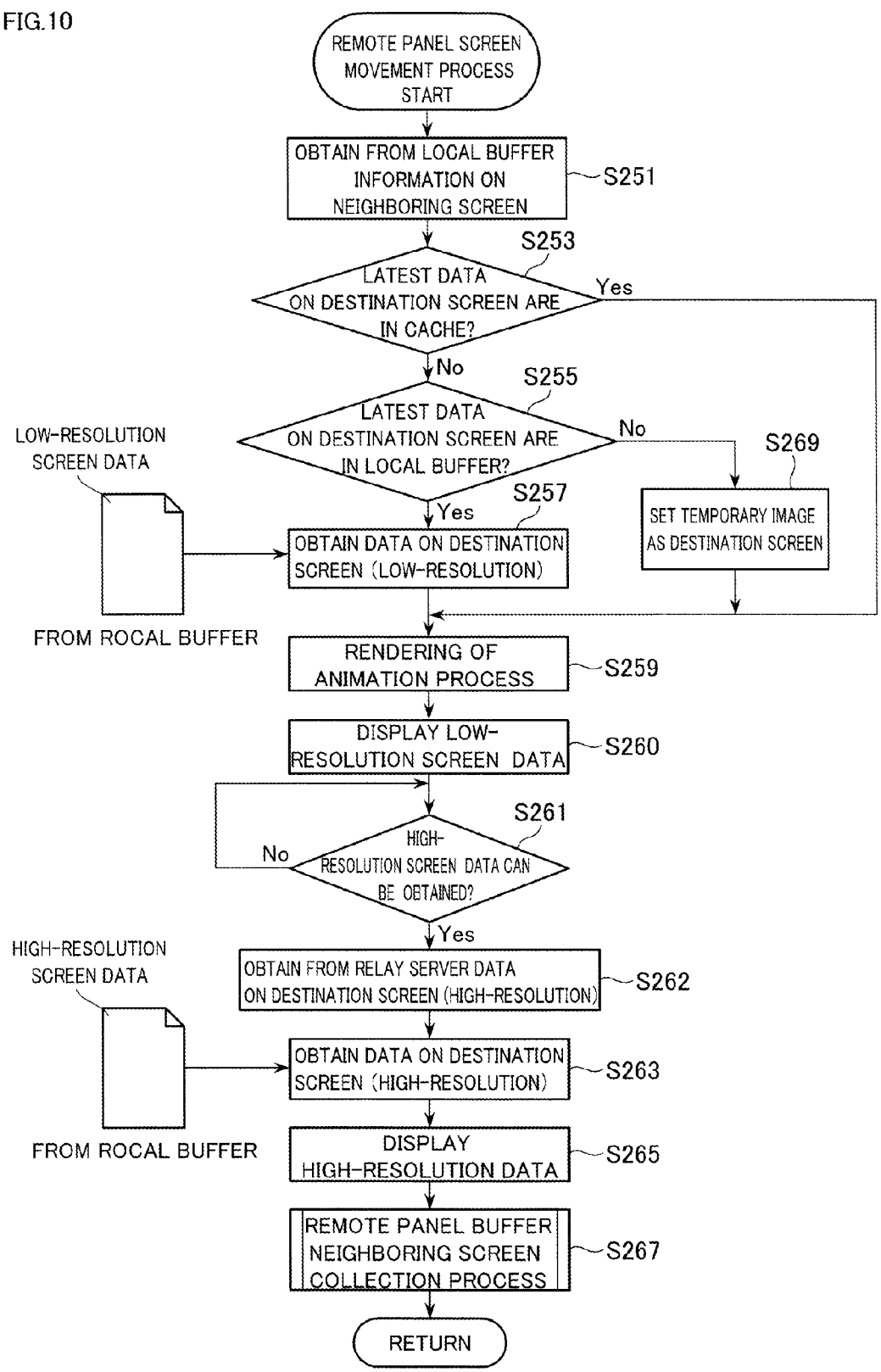
FIG. 10 is a subroutine of step S19 in FIG. 7 in a first variant.

FIG. 10 shows a subroutine of step S19 in FIG. 7 in the first variant.

With reference to FIG. 10, in the remote panel screen movement process in step S19, CPU 301 of remote panel A or B obtains information on neighboring screens of the current display screen (display screen before movement) from the local buffer area (S251) and determines whether remote panel A or B holds the latest data on the destination display screen in a cache (S253). If it is determined in step S253 that the latest data is held in the cache (Yes in S253), then CPU 301 proceeds to a process in step S259.

If it is determined in step S253 that the latest data is not held in the cache (No in S253), then CPU 301 determines whether the local buffer area of remote panel A or B holds the latest data on the destination display screen (S255).

If it is determined in step S255 that the local buffer area holds the latest data (Yes in S255), then CPU 301 obtains low-resolution data on the destination display screen from the local buffer area (S257) and proceeds to a process in step S259. On the other hand, if it is determined in step S255 that the local buffer area does not hold the latest data (No in S255), then remote panels A and B are in a state of not being able to display the destination screen. In this case, CPU 301 sets, as the destination display screen, a temporary image held in advance in storage unit 304 or the like (S269) and proceeds to a process in step S259.

In step S259, CPU 301 performs rendering of an animation process based on the obtained data (S259) and displays a rendered image as the destination display screen (S260). The screen displayed in step S260 is a low-resolution destination display screen if the rendering is performed based on the low-resolution data, or is a temporary image if the temporary image is set as the destination display screen.

Subsequently, CPU 301 determines whether high-resolution data on the destination display screen can be obtained from relay server 200 (S261). The process in step S261 is repeatedly performed until high-resolution data can be obtained.

If it is determined in step S261 that high-resolution data can be obtained (Yes in S261), then CPU 301 obtains high-resolution data on the destination display screen from relay server 200 and saves the high-resolution data in the local buffer area (S262). Subsequently, CPU 301 obtains the high-resolution data on the destination display screen from the local buffer area (S263) and displays a high-resolution destination display screen based on the obtained data (S265). Then, CPU 301 performs a remote panel buffer neighboring screen collection process shown in FIG. 11 (S267) and returns.

Figure 11:
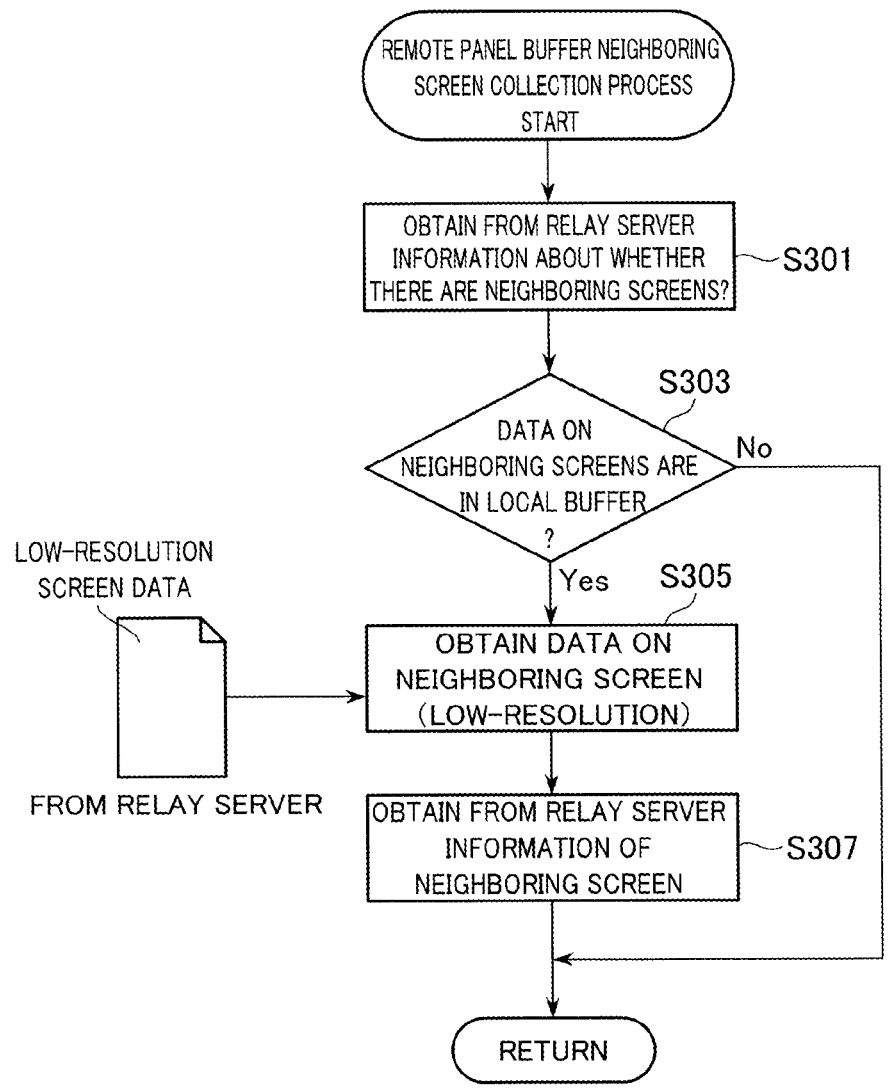
FIG. 11 is a subroutine of step S267 in FIG. 10.

FIG. 11 shows a subroutine of step S267 in FIG. 10.

With reference to FIG. 11, in the remote panel buffer neighboring screen collection process in step S267, CPU 301 obtains from relay server 200 information about whether there are neighboring screens of the destination display screen (S301). Subsequently, CPU 301 determines, based on the information obtained in step S301, whether relay server 200 holds data on the neighboring screens of the destination display screen (S303).

If it is determined in step S303 that data is held (Yes in S303), then CPU 301 obtains from relay server 200 low-resolution data on the neighboring screens of the destination display screen and saves the obtained data in the local buffer area (S305). In step S305, CPU 301 may obtain only data on screens that is not stored in the local buffer area among the data on the neighboring screens of the destination display screen. Then, CPU 301 obtains from relay server 200 information on the neighboring screens of the destination display screen and saves the obtained information in the local buffer area (S307) and then returns. On the other hand, if it is determined in step S303 that data is not held (No in S303), then CPU 301 returns.

[Second Variant of the Operation of the Display System]

Next, a second variant of the operation of the display system of the present embodiment will be described. In the present variant, relay server 200 measures a communication speed of the line of Internet 400 connecting MFP 100 to relay server 200, and determines, based on the measured communication speed, a resolution of data on neighboring screens to be transmitted from MFP 100 to relay server 200.

Figure 12:
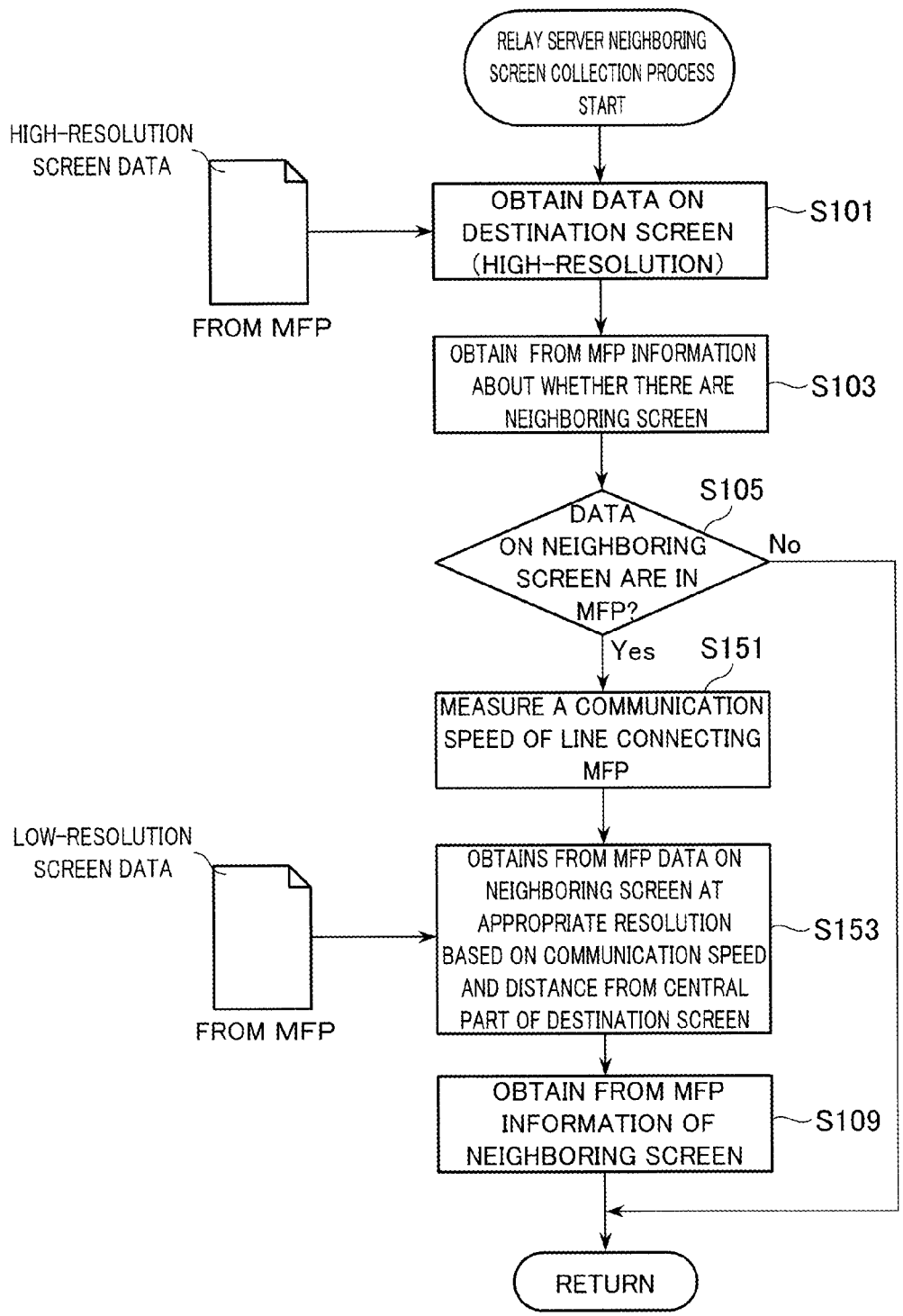
FIG. 12 is a subroutine of step S15 in FIG. 7 in a second variant.

FIG. 12 shows a subroutine of step S15 in FIG. 7 in the second variant.

With reference to FIG. 12, in the relay server neighboring screen collection process in step S15, CPU 201 of relay server 200 obtains from MFP 100 high-resolution data on the destination display screen (S101), and obtains from MFP 100 information about whether there are neighboring screens of the destination display screen (S103). Subsequently, CPU 201 determines, based on the information obtained in step S103, whether MFP 100 holds data on the neighboring screens of the destination display screen (S105).

If it is determined in step S105 that data is held (Yes in S105), then CPU 201 measures a communication speed of the line (network speed) of Internet 400 connecting MFP 100 to relay server 200 (S151). Then, CPU 201 determines, based on the measured communication speed, a resolution of the data on the neighboring screens to be transmitted from MFP 100 to relay server 200, and obtains from MFP 100 low-resolution data on the neighboring screens of the destination display screen at the determined appropriate resolution (S153). Note that in step S153 the resolution may be determined such that the resolution decreases with distance from the central part of the destination display screen, or the resolution may be determined such that the resolution increases as the communication speed increases. Thereafter, CPU 201 obtains from MFP 100 information on the neighboring screens of the destination display screen (S109) and returns. On the other hand, if it is determined in step S105 that data is not held (No in S105), then CPU 201 returns.

Figure 13:
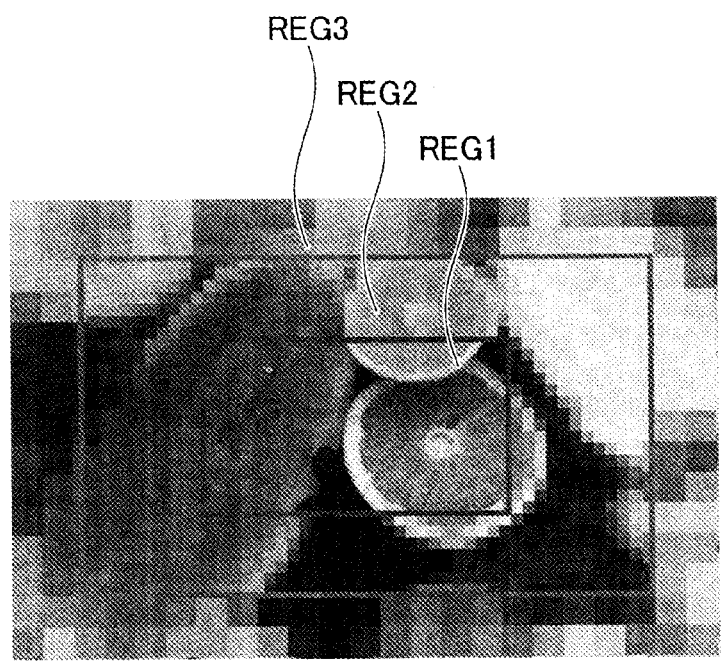
FIG. 13 is a diagram schematically showing a destination display screen obtained when the resolution is determined such that the resolution decreases with distance from a central part of the destination display screen.

FIG. 13 is a diagram schematically showing a destination display screen obtained when the resolution is determined such that the resolution decreases with distance from the central part of the destination display screen.

With reference to FIG. 13, in this display screen, an area REG1 including the central part of the destination display screen has the highest resolution. An area REG2 is adjacent to area REG1 and is further away from the central part of the display screen than area REG1. Area REG2 has a lower resolution than area REG1. An area REG3 is adjacent to area REG2 and is further away from the central part of the display screen than area REG2. Area REG3 has a lower resolution than area REG2.

[Third Variant of the Operation of the Display System]

Next, a third variant of the operation of the display system of the present embodiment will be described. In the present variant, the operation of the display system performed when MFP 100 has accepted an operation to move a display screen will be described.

Figure 14:
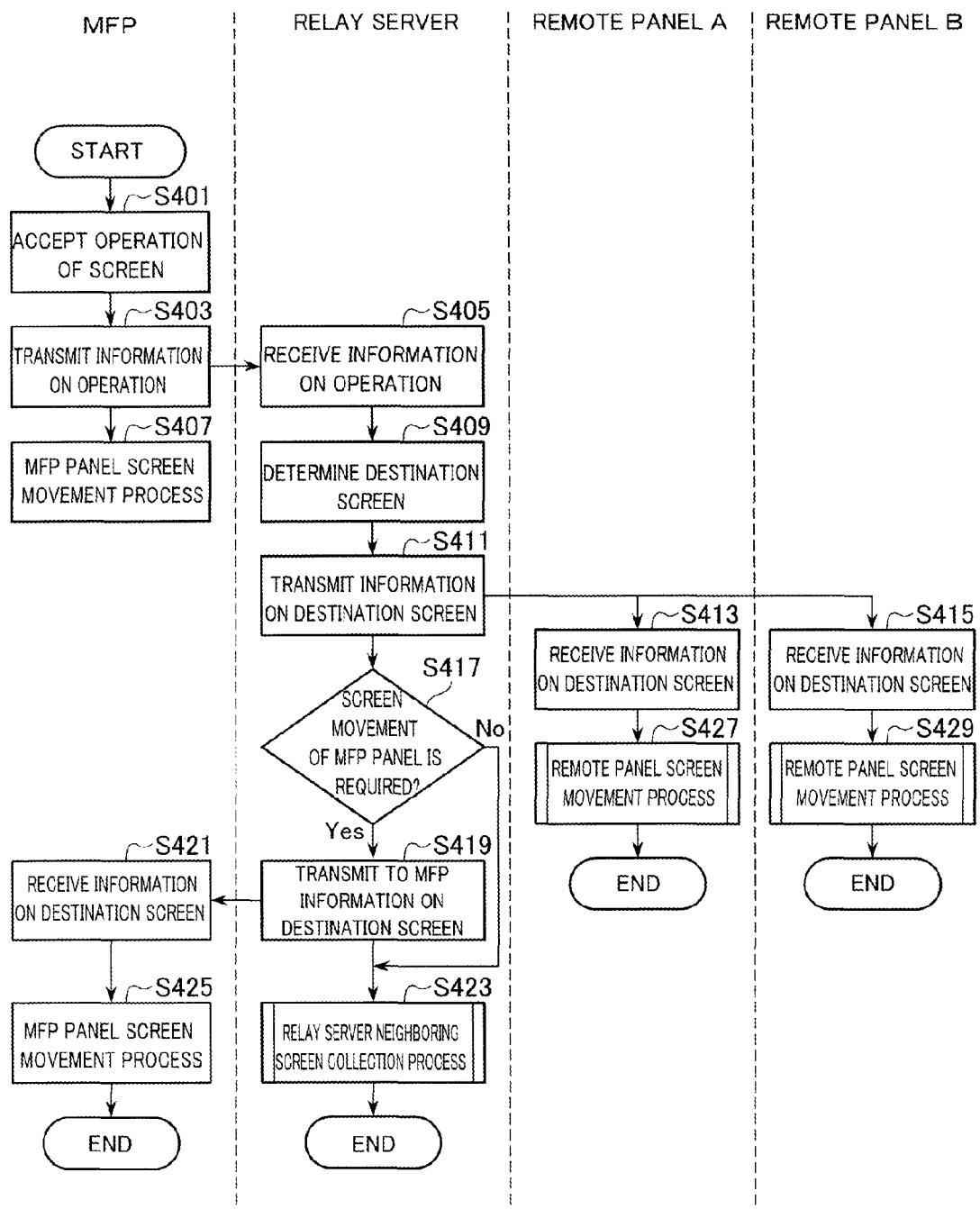
FIG. 14 is a flowchart showing the operation of the display system performed when a display screen is moved, which is initiated by an operation on MFP 100.

FIG. 14 is a flowchart showing the operation of the display system performed when a display screen is moved, which is initiated by an operation on MFP 100.

With reference to FIG. 14, when CPU 101 of MFP 100 accepts an operation to move a display screen on operating panel 107 (S401), CPU 101 transmits information on the operation to relay server 200 (S403). Then, CPU 101 performs an MFP panel screen movement process, based on the information on the accepted operation (S407). Specifically, CPU 101 retrieves, based on the information on the operation accepted on operating panel 107, data on a destination display screen from data on screens stored in storage unit 104, and displays a screen based on the data on operating panel 107.

When CPU 201 of relay server 200 receives the information on the operation transmitted from MFP 100 in step S403 (S405), CPU 201 determines a destination display screen based on the information (S409). In step S409, for example, when relay server 200 has received information on a different operation from remote panel A or B or the like, CPU 201 may determine a destination display screen based on the received information on the different operation. Subsequently, CPU 201 notifies each of remote panels A and B of information on the destination display screen (S411) and determines whether a change of the display screen (screen movement) of operating panel 107 (MFP panel) of MFP 100 is required (S417).

If it is determined in step S417 that a change of the display screen is required (Yes in S417), then CPU 201 notifies MFP 100 of information on the destination display screen (S419) and proceeds to a process in step S423.

Since the MFP panel screen movement process in step S407 is performed before relay server 200 determines a destination display screen, if relay server 200 determines the destination display screen based on a different operation information from the operation information received from MFP 100, then there is a need to change the screen displayed in the MFP panel screen movement process in step S407. In this case, CPU 201 determines in step S417 that a change of the screen is required. When CPU 101 of MFP 100 receives the information on the destination display screen from relay server 200 (S421), CPU 101 cancels the process in step S407 and performs an MFP panel screen movement process based on the information received from relay server 200 (S425) and then ends the process.

If it is determined in step S417 that a change of the display screen is not required (No in S417), then CPU 201 proceeds to a process in step S423. In step S423, CPU 201 performs a relay server neighboring screen collection process shown in, for example, FIG. 8 (S423) and returns.

When CPU 301 of remote panel A receives the information on the destination display screen from relay server 200 (S413), CPU 301 performs a remote panel screen movement process shown in, for example, FIG. 9 (S427) and ends the process. Likewise, when CPU 301 of remote panel B receives the information on the destination display screen from relay server 200 (S415), CPU 301 performs a remote panel screen movement process shown in, for example, FIG. 9 (S429) and ends the process.

[Fourth Variant of the Operation of the Display System]

Next, a fourth variant of the operation of the display system of the present embodiment will be described. In the present variant, the operation of the display system will be described which is performed when, during the period between acceptance of an operation to move a display screen on MFP 100 and displaying of a post-movement screen on each of MFP 100 and remote panels A and B, remote panel A or B has accepted an operation to move a display screen.

Figure 15:
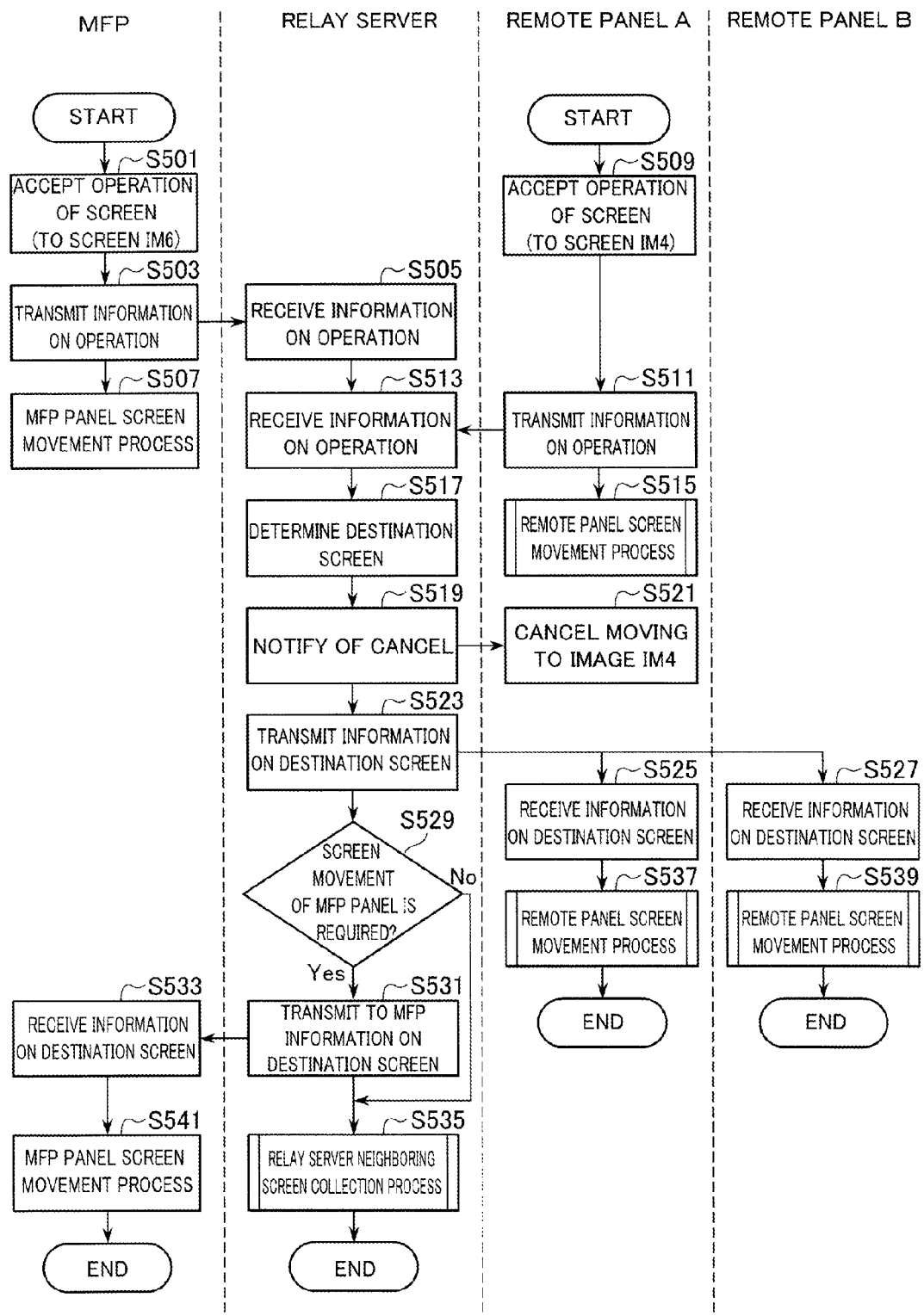
FIG. 15 is a flowchart showing the operation of the display system performed when remote panel A has accepted an operation to move a display screen immediately after MFP 100 has accepted an operation to move a display screen.

FIG. 15 is a flowchart showing the operation of the display system performed when remote panel A has accepted an operation to move a display screen immediately after MFP 100 has accepted an operation to move a display screen.

With reference to FIG. 15, when CPU 101 of MFP 100 accepts an operation to move a display screen to an image IM6 on operating panel 107 (S501), CPU 101 transmits information on the operation to relay server 200 (S503). CPU 201 of relay server 200 receives the information on the operation from MFP 100 (S505). Then, CPU 101 performs an MFP panel screen movement process, based on the information on the operation accepted on operating panel 107 (S507). Specifically, CPU 101 retrieves, based on the information on the operation accepted on operating panel 107, data on image IM6 which is a destination display screen from data on screens stored in storage unit 104, and displays a screen based on the data on operating panel 107.

When CPU 301 of remote panel A accepts an operation to move a display screen to an image IM4 (S509), CPU 301 transmits information on the operation to relay server 200 (S511). Then, CPU 301 performs a remote panel screen movement process (a process of moving to image IM4) shown in, for example, FIG. 10, based on the information on the operation accepted by remote panel A (S515).

When CPU 201 of relay server 200 receives the information on the operation from remote panel A (S513), CPU 201 is in a state of having received the pieces of information on different operations from MFP 100 and remote panel A. When falling into such a state, CPU 201 determines which one of the information on the operation received from MFP 100 and the information on the operation received from remote panel A is given priority. Here, the case will be described in which priority is given to one of the information on the operation received from MFP 100 and the information on the operation received from remote panel A that has been received earlier by relay server 200. In this case, CPU 201 gives priority to the information on the operation received from MFP 100, and thus, determines image IM6 to be the destination display screen, based on the information on the operation received from MFP 100 (S517).

In step S517, CPU 201 may always give priority to information on an operation received from MFP 100, or may always give priority to information on an operation received from remote panel A or B. Alternatively, CPU 201 may determine information on an operation to be given priority, using other criteria than those described above.

Subsequent to the process in step S517, CPU 201 notifies remote panel A which is an apparatus having transmitted the information on the operation other than the information on the operation given priority, of the fact that the operation accepted by remote panel A (the operation to move the display screen to image IM4) has been cancelled (S519). When CPU 301 of remote panel A accepts the notification of cancellation, CPU 301 cancels the process in step S515 (the process of moving to image IM4) (S521).

Subsequent to the process in step S519, CPU 201 notifies each of remote panels A and B of information on the destination display screen (S523) and determines whether a change of the display screen (screen movement) of operating panel 107 (MFP panel) of MFP 100 is required (S529).

If it is determined in step S529 that a change of the display screen is required (Yes in S529), then CPU 201 notifies MFP 100 of information on the destination display screen (S531) and proceeds to a process in step S535.

Since the MFP panel screen movement process in step S507 is performed before relay server 200 determines a destination display screen, if relay server 200 determines the destination display screen based on a different operation information from the operation information received from MFP 100, then there is a need to change the screen displayed in the MFP panel screen movement process in step S507. In this case, CPU 201 determines in step S529 that a change of the screen is required. When CPU 101 of MFP 100 receives the information on the destination display screen from relay server 200 (S533), CPU 101 cancels the process in step S507 and performs an MFP panel screen movement process based on the information on the operation received from relay server 200 (S541) and then ends the process.

If it is determined in step S529 that a change of the display screen is not required (No in S529), then CPU 201 proceeds to a process in step S535. In step S535, CPU 201 performs a relay server neighboring screen collection process shown in, for example, FIG. 8 (S535) and returns.

When CPU 301 of remote panel A receives the information on the destination display screen from relay server 200 (S525), CPU 301 performs a remote panel screen movement process (a process of moving to image IM6) shown in, for example, FIG. 9 (S537) and ends the process. Likewise, when CPU 301 of remote panel B receives the information on the destination display screen from relay server 200 (S527), CPU 301 performs a remote panel screen movement process shown in, for example, FIG. 9 (S539) and ends the process.

Note that the fourth variant may be such that when, during the period between acceptance of an operation on remote panel A or B and displaying of a screen on each of MFP 100 and remote panels A and B, MFP 100 has accepted an operation, relay server 200 determines which one of information on the operation accepted by remote panel A or B and information on the operation accepted by MFP 100 is given priority.

Advantageous Effects of the Embodiment

According to the above-described embodiment, a display system capable of inhibiting degradation of operation response can be provided.

In the above-described embodiment, when an operation to move a display screen is accepted by a remote panel 300 or MFP 100, relay server 200 determines a post-movement display screen based on the condition of each input, and a process for the display screen is reflected in a display image of each remote panel 300 through relay server 200. By this, the traffic between MFP 100 and relay server 200 becomes comparable to that for when a single remote panel is processed.

Thus, without placing a load on the network environment on the customer side or on the operation of MFP 100, display processes for a plurality of remote panels can be simultaneously performed. As a result, a display screen of operating panel 107 of MFP 100 can be operated with no stress using the plurality of remote panels 300 (remote apparatuses), enabling to inhibit degradation of operation response.

According to the first variant, before remote panel A or B accepts an operation to move a display screen, data on the display screen of remote panels A and B and data on neighboring screens of the display screen are held in the local buffer area of remote panel A or B. Thus, after remote panel A or B accepts an operation to move the display screen, the amount of data transmitted from relay server 200 to each of remote panels A and B decreases, enabling to further inhibit degradation of operation response.

According to the second variant, a resolution of data on neighboring screens to be transmitted from MFP 100 to relay server 200 is determined based on the communication speed of Internet 400 connecting MFP 100 to relay server 200. Thus, a delay in the transmission of data from MFP 100 to relay server 200 caused by congestion in the communication line of Internet 400 can be inhibited.

According to the third variant, display screens of MFP 100 and remote panels A and B can be moved based on an operation accepted by MFP 100.

According to the fourth variant, when pieces of information on different operations are accepted from a plurality of apparatuses, relay server 200 can determine a post-movement screen, giving priority to information on a specific operation.

OTHERS

In the above-described embodiment, the case is shown in which, when relay server 200 accepts information on an operation to move display screens of respective MFP 100 and remote panels 300a, 300b, and 300c from a central image IM1 to a neighboring image IM6, the display screens of respective MFP 100 and remote panels 300a, 300b, and 300c change from central image IM1 to neighboring image IM6 all at once. In the present invention, in addition to such an embodiment, the display screens of respective MFP 100 and remote panels 300a, 300b, and 300c may gradually change from central image IM1 to neighboring image IM6 with images in motion being interposed therebetween.

Figure 16:
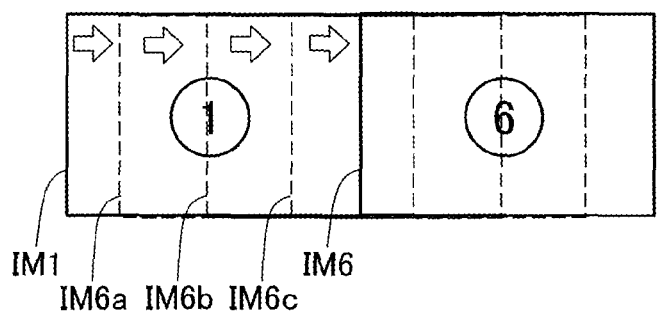
FIG. 16 is a diagram schematically showing a state in which a display screen of each of MFP 100 and remote panels 300a, 300b, and 300c gradually changes from a central image IM1 to a neighboring image IM6 with images in motion being interposed therebetween.
Figure 17:
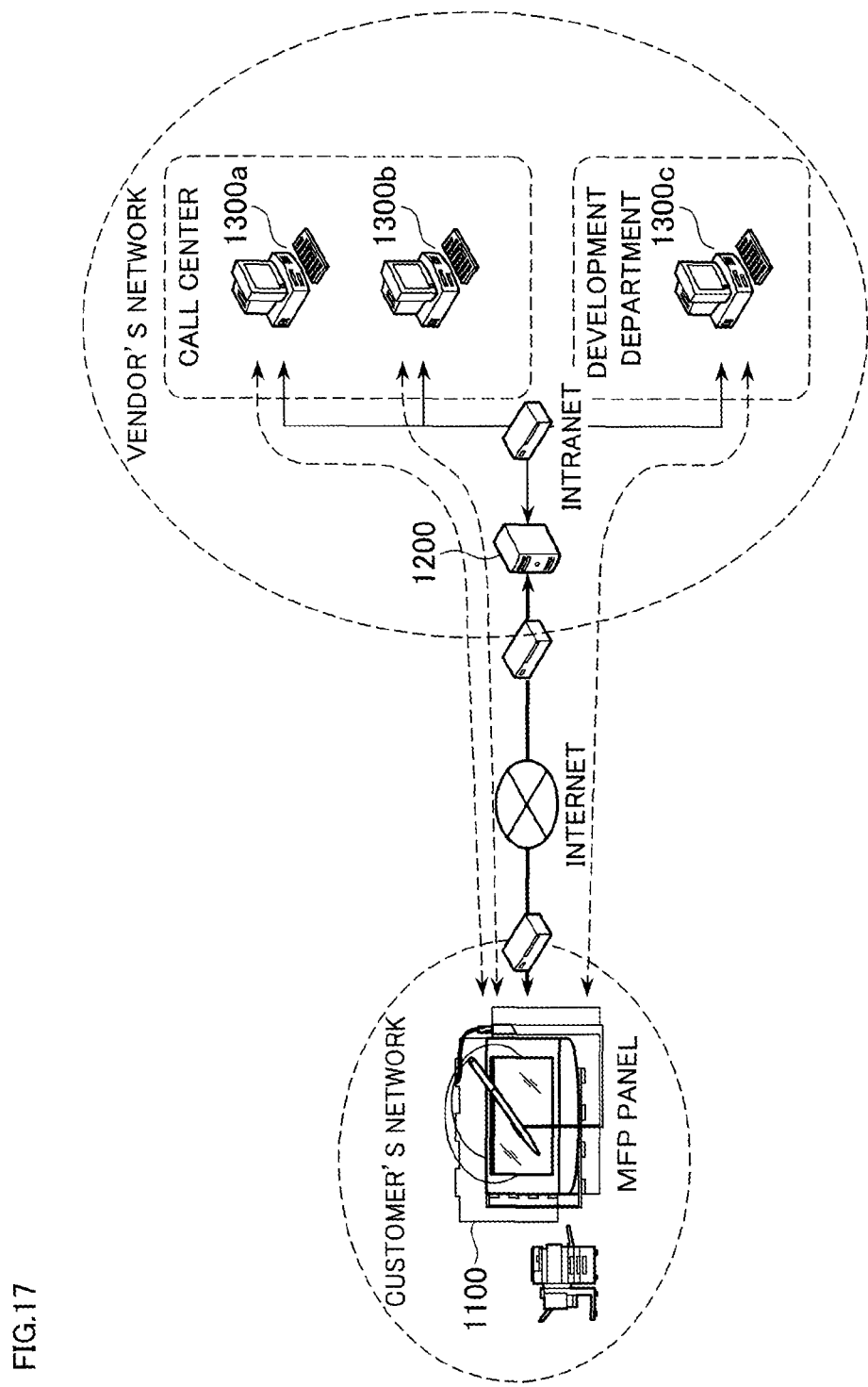
FIG. 17 is a diagram schematically showing transmission and reception of data between an image forming apparatus and each remote panel in a conventional display system.

FIG. 16 is a diagram schematically showing a state in which a display screen of each of MFP 100 and remote panels 300a, 300b, and 300c gradually changes from a central image IM1 to a neighboring image IM6 with images in motion being interposed therebetween.

With reference to FIG. 16, a display screen of each of MFP 100 and remote panels 300a, 300b, and 300c changes from a central image IM1 to images in motion IM6a, IM6b, and IM6c in turn and then finally changes to a neighboring image IM6. In this case, data on each of images in motion IM6a, IM6b, and IM6c may be generated by each of remote panels 300a, 300b, and 300e based on central image IM1 and neighboring image IM6 received from relay server 200, or may be generated by relay server 200 based on data saved in the screen buffer area for animation.

The above-described embodiments can be appropriately combined. For example, the first variant can be combined with any of the second to fourth variants, or in the first variant a display screen may be changed in the manner shown in FIG. 16.

The processes in the above-described embodiments may be performed by software or may be performed using hardware circuits. In addition, a program that performs the processes in the above-described embodiments can be provided, or the program may be recorded in a recording medium such as a CD-ROM, a flexible disk, a hard disk, a ROM, a RAM, or a memory card, and provided to a user. The program is executed by a computer such as a CPU. In addition, the program may be downloaded onto an apparatus through a communication line such as the Internet.

Although the present invention has been described and illustrated in detail, it is clearly understood that the same is by way of illustration and example only and is not to be taken by way of limitation, the scope and spirits of the present invention being limited only by the terms of the appended claims.

What is claimed is:

1. A display system including an image forming apparatus including a display unit; a relay apparatus connected to said image forming apparatus by a first network; and a first display apparatus and a second display apparatus connected to said relay apparatus by a second network having a higher speed than said first network, the display system comprising:
   a first operation acceptor for accepting, by said first display apparatus, an operation to move a displayed screen;
   a first operation information transmitter for transmitting information on the operation accepted by said first operation acceptor, from said first display apparatus to said relay apparatus;
   a destination screen determining unit for determining, by said relay apparatus, a destination display screen based on the information transmitted by said first operation information transmitter;
   a destination screen information transmitter for transmitting information on the destination display screen from said relay apparatus to each of said image forming apparatus and said first and second display apparatuses;
   a first destination screen data transmitter for transmitting data on the destination display screen from said relay apparatus to each of said first and second display apparatuses;
   a screen display unit for displaying a screen based on the information transmitted by said destination screen information transmitter, on each of said display unit and said first and second display apparatuses; and
   a neighboring screen data transmitter for transmitting data on a neighboring screen of the destination display screen from said image forming apparatus to said relay apparatus after transmitting the information on said destination display screen by said destination screen information transmitter.

2. The display system according to claim 1, further comprising a second destination screen data transmitter for transmitting, after transmitting the data on the destination display screen by said first destination screen data transmitter, data on the screen from said relay apparatus to each of said first and second display apparatuses, the data on the screen being data on said destination display screen and having a higher resolution than the data on the destination display screen transmitted by said first destination screen data transmitter.

3. The display system according to claim 1, further comprising a high-resolution screen data transmitter for transmitting, after transmitting the information on said destination display screen by said destination screen information transmitter, data on said destination display screen from said image forming apparatus to said relay apparatus, wherein
   said neighboring screen data transmitter transmits, after transmitting the data on the destination display screen by said high-resolution screen data transmitter, data on the screen from said image forming apparatus to said relay apparatus, the data on the screen being data on the neighboring screen of said destination display screen and having a lower resolution than the data on the destination display screen transmitted by said high-resolution screen data transmitter.

4. The display system according to claim 1, wherein
   when the data on the neighboring screen is transmitted by said neighboring screen data transmitter, said first destination screen data transmitter transmits the data on the neighboring screen transmitted by said neighboring screen data transmitter, from said relay apparatus to each of said first and second display apparatuses, and
   the display system further comprises a display apparatus storage unit for storing the data on the neighboring screen transmitted by said first destination screen data transmitter, in buffer areas of said respective first and second display apparatuses.

5. The display system according to claim 4, wherein said first destination screen data transmitter transmits only data on a screen not stored in said display apparatus storage unit among pieces of data on neighboring screens of said destination display screen, from said relay apparatus to each of said first and second display apparatuses.

6. The display system according to claim 1, further comprising a relay apparatus storage unit for storing data on the neighboring screen transmitted by said neighboring screen data transmitter, in a buffer area of said relay apparatus, wherein
   said neighboring screen data transmitter transmits only data on a screen not stored in said relay apparatus storage unit among pieces of data on neighboring screens of said destination display screen, from said image forming apparatus to said relay apparatus.

7. The display system according to claim 1, further comprising:
   a measuring unit for measuring a communication speed of a line connecting said image forming apparatus to said relay apparatus; and
   a resolution determining unit for determining a resolution of the data on the screen transmitted by said neighboring screen data transmitter, based on the communication speed measured by said measuring unit.

8. The display system according to claim 7, wherein said resolution determining unit determines the resolution such that the resolution decreases with distance from a central part of the destination display screen.

9. The display system according to claim 1, wherein when said screen display unit cannot display the screen based on the information transmitted by said destination screen information transmitter, on at least one of said first and second display apparatuses, said screen display unit displays a predetermined temporary image on at least one of said first and second display apparatuses.

10. The display system according to claim 1, further comprising:
    a second operation acceptor for accepting, by said image forming apparatus, an operation to move a display screen; and
    a second operation information transmitter for transmitting information on the operation accepted by said second operation acceptor, from said image forming apparatus to said relay apparatus.

11. The display system according to claim 10, further comprising a priority operation determining unit for determining, when an operation is accepted by said second operation acceptor during a period between acceptance of an operation by said first operation acceptor and displaying of a screen by said screen display unit, or when an operation is accepted by said first operation acceptor during a period between acceptance of an operation by said second operation acceptor and displaying of a screen by said screen display unit, which one of information on the operation accepted by said first operation acceptor and information on the operation accepted by said second operation acceptor is given priority.

12. The display system according to claim 11, further comprising a cancellation notifying unit for notifying one of said image forming apparatus and said first display apparatus that has transmitted the information on the operation other than the information on the operation determined by said priority operation determining unit, of a fact that the operation has been cancelled.

13. A control method for a display system including an image forming apparatus including a display unit; a relay apparatus connected to said image forming apparatus by a first network; and a first display apparatus and a second display apparatus connected to said relay apparatus by a second network having a higher speed than said first network, the control method comprising:
    accepting, by said first display apparatus, an operation to move a displayed screen;
    transmitting information on the operation accepted while the operation to move a display screen is accepted, from said first display apparatus to said relay apparatus;
    determining, by said relay apparatus, a destination display screen based on the information transmitted while the information on the operation is transmitted;
    transmitting information on the destination display screen from said relay apparatus to each of said image forming apparatus and said first and second display apparatuses;
    transmitting data on the destination display screen from said relay apparatus to each of said first and second display apparatuses;
    displaying a screen based on the information transmitted while the information on the destination display screen is transmitted, on each of said display unit and said first and second display apparatuses; and
    transmitting data on a neighboring screen of the destination display screen from said image forming apparatus to said relay apparatus after transmitting the information on said destination display screen.

14. The control method for a display system according to claim 13, further comprising transmitting, after transmitting the data on the destination display screen, higher resolution data on the screen from said relay apparatus to each of said first and second display apparatuses, the higher resolution data on the screen being data on said destination display screen and having a higher resolution than the data on the destination display screen transmitted while the data on the destination display screen is transmitted.

15. The control method for a display system according to claim 13, further comprising transmitting, after transmitting the information on said destination display screen, high resolution data on said destination display screen from said image forming apparatus to said relay apparatus, wherein
    while the data on the neighboring screen of the destination display screen is transmitted, after transmitting the higher resolution data on the destination display screen, lower resolution data on the screen is transmitted from said image forming apparatus to said relay apparatus, the lower resolution data on the screen being data on the neighboring screen of said destination display screen and having a lower resolution than the high resolution data on the destination display screen transmitted while the higher resolution data on the destination display screen is transmitted.

16. A non-transitory computer-readable recording medium encoded with a program for controlling a display system, said display system including an image forming apparatus including a display unit; a relay apparatus connected to said image forming apparatus by a first network; and a first display apparatus and a second display apparatus connected to said relay apparatus by a second network having a higher speed than said first network, said program causing a computer to execute processing comprising:
    accepting, by said first display apparatus, an operation to move a displayed screen;
    transmitting information on the operation accepted while the operation to move a display screen is accepted, from said first display apparatus to said relay apparatus;
    determining, by said relay apparatus, a destination display screen based on the information transmitted while the information on the operation is transmitted;
    transmitting information on the destination display screen from said relay apparatus to each of said image forming apparatus and said first and second display apparatuses;
    transmitting data on the destination display screen from said relay apparatus to each of said first and second display apparatuses;
    displaying a screen based on the information transmitted while the information on the destination display screen is transmitted, on each of said display unit and said first and second display apparatuses; and
    transmitting data on a neighboring screen of the destination display screen from said image forming apparatus to said relay apparatus after transmitting the information on said destination display screen.

17. The recording medium according to claim 16, wherein said program causing a computer to execute processing further comprising transmitting, after transmitting the data on the destination display screen, higher resolution data on the screen from said relay apparatus to each of said first and second display apparatuses, the higher resolution data on the screen being data on said destination display screen and having a higher resolution than the data on the destination display screen transmitted while the data on the destination display screen is transmitted.

18. The recording medium according to claim 16, wherein said program causing a computer to execute processing further comprising transmitting, after transmitting the information on said destination display screen, high resolution data on said destination display screen from said image forming apparatus to said relay apparatus, wherein
    while the data on the neighboring screen of the destination display screen is transmitted, after transmitting the higher resolution data on the destination display screen, lower resolution data on the screen is transmitted from said image forming apparatus to said relay apparatus, the lower resolution data on the screen being data on the neighboring screen of said destination display screen and having a lower resolution than the high resolution data on the destination display screen transmitted while the higher resolution data on the destination display screen is transmitted.

19. A non-transitory computer-readable recording medium encoded with a program for controlling a relay apparatus, said relay apparatus being connected, by a first network, to an image forming apparatus including a display unit and being connected to a first display apparatus and a second display apparatus by a second network having a higher speed than said first network, said program causing a computer to execute processing comprising:
- receiving information on an operation to move a displayed display screen from said first display apparatus, the operation being accepted by said first display apparatus;
- determining a destination display screen based on the information received while the information on the operation to move a display screen is received;
- transmitting information on the destination display screen to each of said image forming apparatus and said first and second display apparatuses;
- transmitting data on the destination display screen to each of said first and second display apparatuses; and
- receiving data on a neighboring screen of the destination display screen from said image forming apparatus after transmitting the information on said destination display screen.

20. The recording medium according to claim 19, wherein said program causing a computer to execute processing further comprising transmitting, after transmitting the data on the destination display screen, higher resolution data on the screen to each of said first and second display apparatuses, the higher resolution data on the screen being data on said destination display screen and having a higher resolution than the data on the destination display screen transmitted while the data on the destination display screen is transmitted.

21. The recording medium according to claim 19, wherein said program causing a computer to execute processing further comprising receiving, after transmitting the information on said destination display screen, high resolution data on said destination display screen from said image forming apparatus, wherein
- while the data on the neighboring screen of the destination display screen is received, after receiving the high resolution data on the destination display screen, lower resolution data on the screen is received from said image forming apparatus, the lower resolution data on the screen being data on the neighboring screen of said destination display screen and having a lower resolution than the high resolution data on the destination display screen received while the higher resolution data on said destination display screen is received.

\* \* \* \* \*